(12) United States Patent
Bristol et al.

(10) Patent No.: US 11,719,944 B2
(45) Date of Patent: Aug. 8, 2023

(54) SWAPPABLE STRAP FOR A HEAD-MOUNTED DISPLAY SYSTEM

(71) Applicant: META PLATFORMS TECHNOLOGIES, LLC, Menlo Park, CA (US)

(72) Inventors: Peter Wesley Bristol, Seattle, WA (US); Shane Michael Ellis, Bellevue, WA (US); Joseph Patrick Sullivan, Seattle, WA (US); Joel Bernard Jacobs, Seattle, WA (US); Glen Jason Tompkins, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 685 days.

(21) Appl. No.: 16/733,527

(22) Filed: Jan. 3, 2020

(65) Prior Publication Data

US 2021/0211640 A1    Jul. 8, 2021

(51) Int. Cl.
  *G02B 27/01*    (2006.01)
  *H04N 13/332*   (2018.01)
  *H04R 1/10*     (2006.01)
  *H04R 5/033*    (2006.01)

(52) U.S. Cl.
  CPC ....... *G02B 27/0176* (2013.01); *H04N 13/332* (2018.05); *H04R 1/105* (2013.01); *H04R 1/1008* (2013.01); *H04R 1/1058* (2013.01); *H04R 5/0335* (2013.01); *H04N 2213/001* (2013.01)

(58) Field of Classification Search
  None
  See application file for complete search history.

(56) References Cited

U.S. PATENT DOCUMENTS

| | | | |
|---|---|---|---|
| 10,212,517 B1 * | 2/2019 | Beltran | G02B 27/0101 |
| 2017/0337737 A1 * | 11/2017 | Edwards | F16M 13/04 |
| 2018/0348812 A1 * | 12/2018 | Miller | G06F 1/1686 |
| 2021/0216099 A1 * | 7/2021 | Goodner | G06F 1/163 |

* cited by examiner

*Primary Examiner* — Duc Nguyen
*Assistant Examiner* — Assad Mohammed
(74) *Attorney, Agent, or Firm* — Greenberg Traurig, LLP

(57) ABSTRACT

A head-mounted display (HMD) system may include a body having a right side and a left side, a display device coupled to the body and positioned to display content to a user when the HMD system is donned by the user, a right side arm coupled to the right side of the body and dimensioned such that, when coupled to a first portion of a swappable strap, the right side arm and the first portion of the strap form a first fastener, and a left side arm coupled to the left side of the body and dimensioned such that, when coupled to a second portion of the strap, the left side arm and the second portion of the strap form a second fastener. The first fastener and the second fastener may detachably secure the strap to the body of the HMD system. Various other methods and systems are also disclosed.

20 Claims, 15 Drawing Sheets

SWAPPABLE STRAP FOR A HEAD-MOUNTED DISPLAY SYSTEM

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
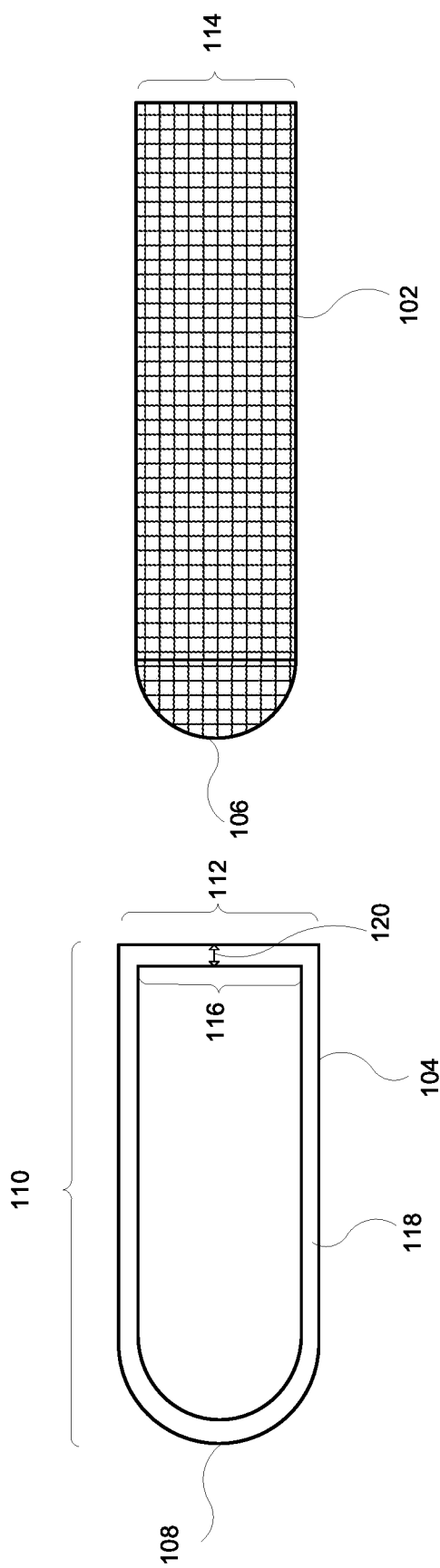
FIG. 1 is an illustration of an example strap and an example strap end snap piece.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A head-mounted display (HMD) system may be donned by a user so that a body of the head-mounted display system may mostly or completely cover a field of view of the user and a display device coupled to the body may be positioned to display content to the user. A band or strap shaped to fit around a head of the user may be detachably connected to side arms included on a right side and a left side of the body of the head-mounted display system. The detachable connection of the strap to the side arms of the body of the head-mounted display device may form a fastener at the right side and a fastener at the left side of the body of the head-mounted display device. The detachable strap, which also may be referred to as a swappable strap, may facilitate a secure and comfortable placement of the head-mounted display system on the head of the user. The detachable strap may be made of a flexible material that may be adjusted to position and hold the body of the head-mounted display system over the field of view of the user allowing the user to view the content displayed by the display device.

In some implementations, it may be advantageous for the body of the head-mounted display system to be configured to connect to more than one type of strap. It may also be advantageous for the body of the head-mounted display system to be configured to connect to multiple different straps and/or for a detachable strap to be configured to connect to multiple head-mounted display systems. Including side arms on each side of the body that are dimensioned to be detachably coupled to a respective snap piece included on each end of a strap may allow swappable straps that may be interchangeably attached to and detached from the body of the head-mounted display system. The ability to easily attach a strap to and detach a strap from a body of a head-mounted display system may ease manufacturing constraints for the head-mounted display system. In addition, or in the alternative, it may be more desirable for a user of the head-mounted display system to detach a strap from the body, adjust the strap for a secure and comfortable fit, and then to re-attach the strap to the body of the head-mounted display system. Furthermore, embodiments of this disclosure may allow users to select different straps, replace worn-out straps, swap straps for different users, and/or remove straps for cleaning.

The present disclosure is generally directed to systems and methods for making and using head-mounted display systems that may include side arms dimensioned for detachably coupling to snap piece assemblies included on portions of a swappable strap. The snap piece assemblies may be dimensioned for detachably coupling to each of the respective side arms. The side arms may be attached to sides of a body of the head-mounted display system. The detachable coupling of a portion of a swappable strap to a side arm of a body of a head-mounted display system may be performed by positioning a top of a snap piece assembly of the swappable strap on an upper end of a side arm, positioning a bottom of the snap piece assembly on a lower end of the side arm, and applying a force to an upper side of the snap piece assembly. The assembly may be configured such that the applied force may attach or snap the swappable strap to the side arms of the body of the head-mounted display system resulting in the formation of fasteners at each side of the body of the head-mounted display system.

As will be explained in greater detail below, embodiments of the present disclosure may include a head-mounted display system including a body, a display device coupled to the body, a right side arm coupled to a right side of the body and extending toward a back of the right side of the body, and a left side arm coupled to a left side of the body and extending toward a back of the left side of the body. The right side arm may be dimensioned to be detachably coupled to a first portion of the strap. The left side arm may be dimensioned to be detachably coupled to a second portion of the strap. The display device may be coupled to the body such that, when the head-mounted display system is donned by a user, the display device is positioned to display content to the user.

Features from any of the embodiments described herein may be used in combination with one another in accordance with the general principles described herein. These and other embodiments, features, and advantages will be more fully understood upon reading the following detailed description in conjunction with the accompanying drawings and claims.

In the following description, the discussion corresponding to FIGS. 1, 2, and 3 covers strap end snap pieces and strap end snap piece assemblies, the discussion corresponding to FIGS. 4-7 covers side arms for a body of a head-mounted display system. Furthermore, the discussion corresponding to FIGS. 8-12 covers detachably coupling strap end snap piece assemblies of a detachable strap to respective side arms on a body of a head-mounted display system.

FIG. 1 is an illustration of an example strap 102 and an example strap end snap piece 104. The strap 102 may include a formed end 106 that may be finished and dimensioned for coupling or attaching to the strap end snap piece 104. A shaped front end 108 of strap end snap piece 104 may be dimensioned to fit or accept the formed end 106 of the strap 102. In some implementations, for example, the formed end 106 may be cut and finished to provide a smooth finished end to the strap 102 without any fraying. In addition, or in the alternative, the formed end 106 may be cut and finished such that it is dimensioned for coupling to the strap end snap piece 104.

A formed end of a strap may be of various geometric shapes and dimensions. A shaped front end of a strap end snap piece may be dimensioned accordingly to accommodate, fit, or accept the formed end of the strap. Additionally, or alternatively, a formed end of a strap may also be dimensioned accordingly to fit into a strap end snap piece. The formed end 106 of the strap 102, as shown in FIG. 1 is rounded; however, in some implementations, a formed end of a strap may be square, straight, triangular, or any other geometric shape. The formed end 106 of the strap 102 may be dimensioned so that it fits into the strap end snap piece 104. For example, the strap 102 may be dimensioned such that a width 114 of the strap 102 is such that it may be accommodated in the strap end snap piece 104 based on an inner width 116 of the strap end snap piece 104.

The coupling of the formed end 106 of the strap 102 to the strap end snap piece 104 may be performed in a variety of ways. For example, the formed end 106 of the strap 102 may be coupled to the strap end snap piece 104 in such a way that at least a portion of the end of the strap 102 including the formed end 106 is affixed to at least a portion of the strap end snap piece 104. In another example, the formed end 106 of the strap 102 may be coupled to the strap end snap piece 104 in such a way that a portion of the end of the strap 102 including the formed end 106 is affixed to the entire strap end snap piece 104.

A strap may be made or formed of a variety of materials or fabrics that may provide a band that may be shaped and/or adjusted to fit around a head of a user. In some implementations, a strap may be made or formed of a flexible, soft, and/or non-rigid type of fabric. In some implementations, a strap may be made or formed of a hard, a semi-hard, or a soft material. For example, the materials may be a type of woven fabric, an elastic, a knitted fabric, a fibrous fabric, or a webbing. Furthermore, the fabric may be made from any suitable material, including nylon, rayon, polypropylene, thermoplastic polyurethane (TPU) plastic, an elastomer, or other polymeric materials.

A strap end snap piece may be attached, coupled, connected, or affixed to an end of a strap using a variety of techniques. The portion of an end of the strap 102 that includes the formed end 106 may be bonded to the strap end snap piece 104 using one or more of an adhesive substance, heat, and pressure. In some implementations, the adhesive substance may be a thermoset adhesive. In some implementations, the portion of an end of the strap 102 that includes the formed end 106 may be bonded to the strap end snap piece 104 by curing a bonding agent applied to the connection of the portion of the end of the strap 102 and the strap end snap piece 104 with heat and/or pressure. In some implementations, the adhesive substance may include glues, epoxies, or various plastic agents that may bond the strap end snap piece 104 to the portion of the end of the strap 102 that includes the formed end 106 by evaporation of a solvent applied to the connection of the portion of the end of the strap 102 and the strap end snap piece 104.

The strap end snap piece 104 may be formed and dimensioned to provide a physical interface for mateably and demateably engaging with a respective interface of a connector or other type of interface piece of an object. The strap end snap piece 104 may be dimensioned having an outer edge 118 with an outer edge width 120, an outer width 112, an inner width 116, and a length 110. The length 100, the outer width 112 and/or the inner width 116 may be any suitable dimension. For example, the length 110 may be approximately between five centimeters and ten centimeters. The outer width 112 may be approximately between twelve millimeters and fifty millimeters. The inner width 116 may be of a width to accommodate the width 114 of the strap 102. For example, the inner width 116 may be approximately equal to the width 114 of the strap 102. The width 114 of the strap 102 may be approximately between ten millimeters and fifty millimeters. The outer width 112 and the inner width 116 may each be dimensioned such that the outer edge width 120 may provide a physical interface for mateably and demateably engaging with a respective interface of a connector attached to an object.

A strap end snap piece affixed to an end of a flexible strap may provide a rigidity, stiffness, and/or a lifter to the end of the strap to facilitate the detachable connecting and disconnecting of the strap to an object. A strap may be made or formed of a flexible, soft, and/or non-rigid type of material or fabric. The strap end snap piece 104 may be a hard good made of a hard or semi-hard type of material providing a rigidity to an end of a strap making it easier to attach and detach the end of the strap by detachably coupling the strap end snap piece 104 to a connector on an object dimensioned to interface with the strap end snap piece 104. For example, the hard, semi-hard, or rigid material may be a type of plastic, metal, textile, or fine ceramic that exhibits little to no bending or flexing when a force is applied to the strap end snap piece when connecting the strap to a connector included on an object.

Figure 2:
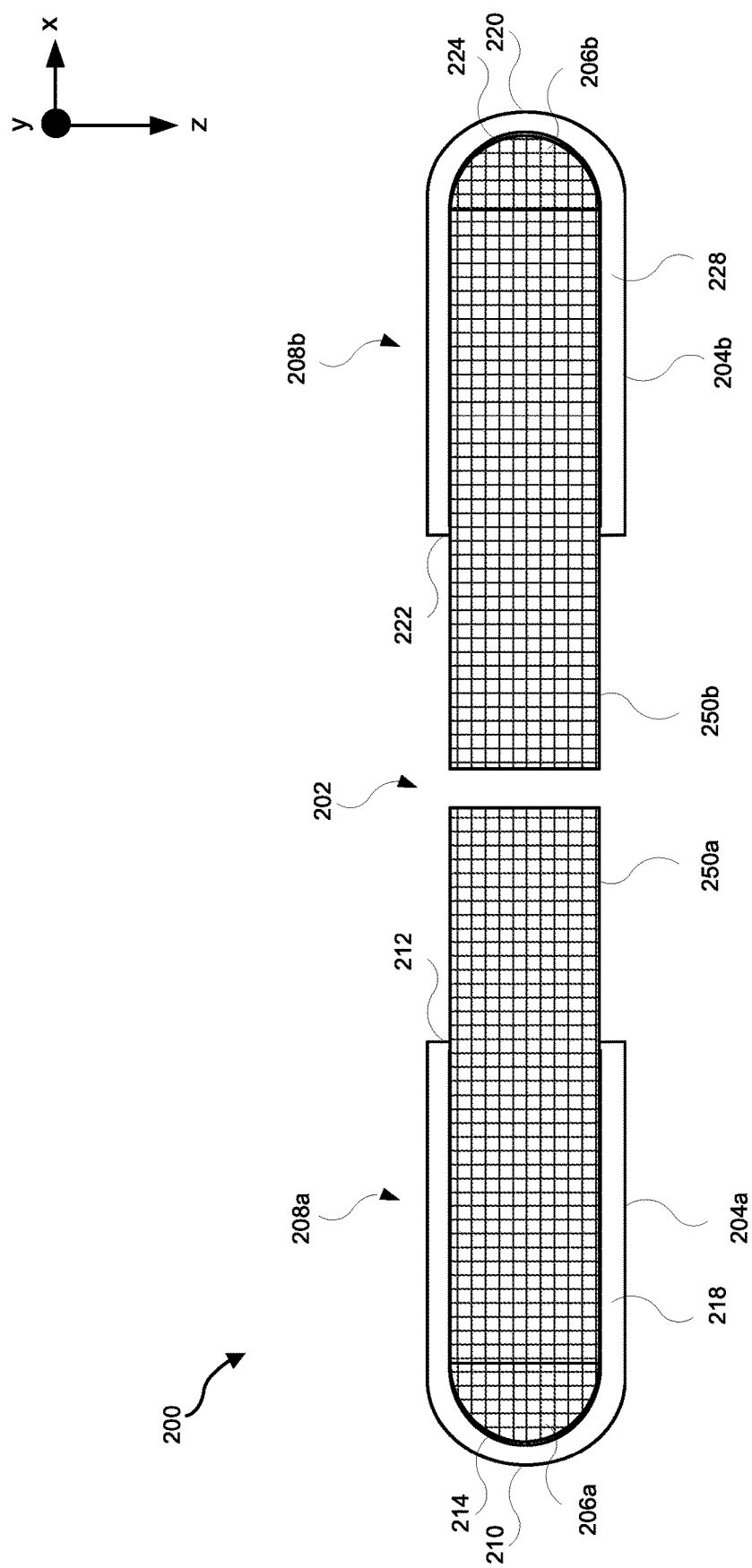
FIG. 2 is an illustration of a perspective view of formed ends of a strap fitted into respective strap end snap pieces forming respective snap piece assemblies.

FIG. 2 is an illustration of a perspective view 200 of formed ends 206a-b of a strap 202 fitted into respective strap end snap pieces 204a-b, thereby forming snap piece assemblies 208a-b, respectively. The perspective view 200 may be from an underside or back of the snap piece assemblies 208a-b. The strap 202 shown in FIG. 2 may be an exemplary configuration of the strap 102 shown in FIG. 1. Each snap piece assembly may include a top, a bottom, and an outer edge. Referring also to FIG. 1, an outer edge 218 and an outer edge 228 of respective snap piece assemblies 208a-b may be the outer edge 118 as described for the strap end snap piece 104 in FIG. 1. The snap piece assembly 208a may include a top 210 and a bottom 212. The snap piece assembly 208b may include a top 220 and a bottom 222.

A strap may have more than one formed end (e.g., two or more) that may be affixed to a respective strap end snap piece. The strap 202 may include a first portion 250a and a second portion 250b, and each portion may include a formed end (e.g., formed end 206a and formed end 206b, respectively). Each formed end 206a-b may be affixed to a respective strap end snap piece 204a-b, resulting in snap piece assemblies 208a-b, respectively. For example, each formed end 206a-b may be coupled, attached, or affixed to the respective strap end snap piece 204a-b as described with reference to the coupling, attaching, affixing, and connecting of the portion of the strap that includes the formed end 106 to the strap end snap piece 104 as described in FIG. 1. Referring to FIG. 2, the first portion 250a of the strap 202 may be affixed to the strap end snap piece 204a from a top location 214 of the strap end snap piece 204a to the bottom 212 of the strap end snap piece 204a. In some implementations, affixing the first portion 250a of the strap 202 to the strap end snap piece 204a may begin at the top location 214 and may end before the bottom 212 of the strap end snap piece 204a. Referring to FIG. 2, the second portion 250b of the strap 202 may be affixed to the strap end snap piece 204b from a top location 224 of the strap end snap piece 204b to the bottom 222 of the strap end snap piece 204b. In some implementations, affixing the second portion 250b of the strap 202 to the strap end snap piece 204b may begin at the top location 224 and may end before the bottom 222 of the strap end snap piece 204b.

Figure 3A:
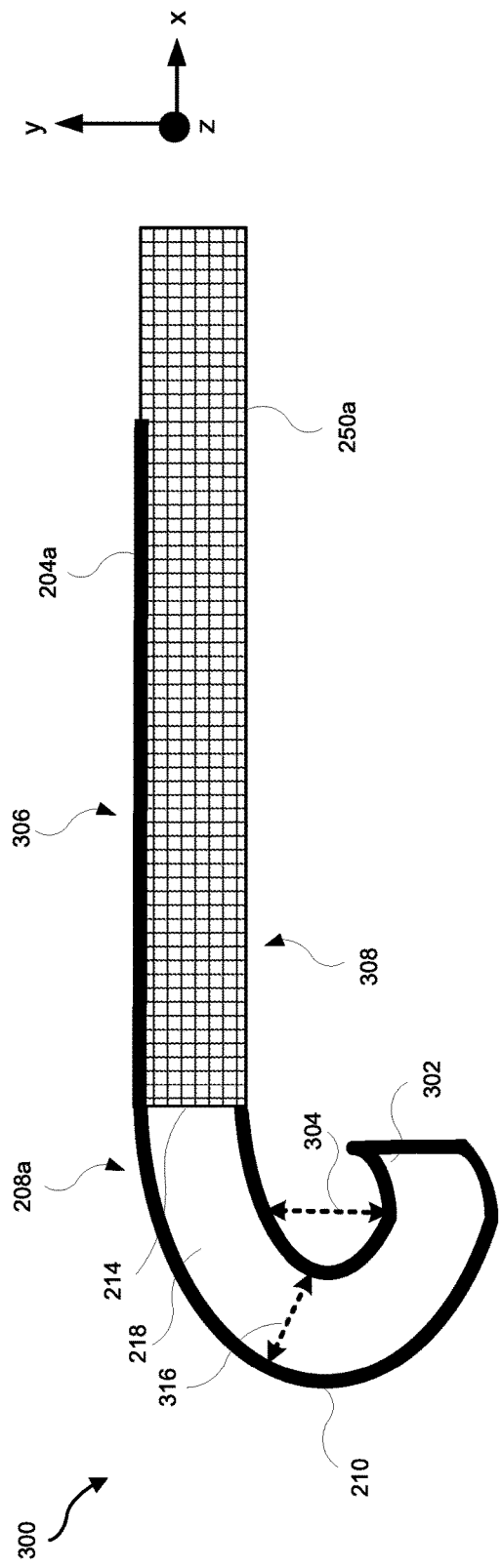
FIG. 3A is an illustration of a perspective view of a snap piece assembly.

FIG. 3A is an illustration of a perspective view 300 of the snap piece assembly 208a. Referring to FIG. 2, the perspective view 300 shows the top 210 of the snap piece assembly 208a and the top location 214 of the strap end snap piece 204a where the formed end 206a of the first portion 250a of the strap 202 is affixed to the strap end snap piece 204a. Referring to FIGS. 1 and 2, the perspective view 300 shows the outer edge 218 having outer edge width 316 (e.g., the outer edge width 120 as shown in FIG. 1). The perspective view 300 shows a front side 306 and a back side 308 of the snap piece assembly 208a. The perspective view 300 may be a cross-sectional view of the snap piece assembly 208a.

Figure 3B:
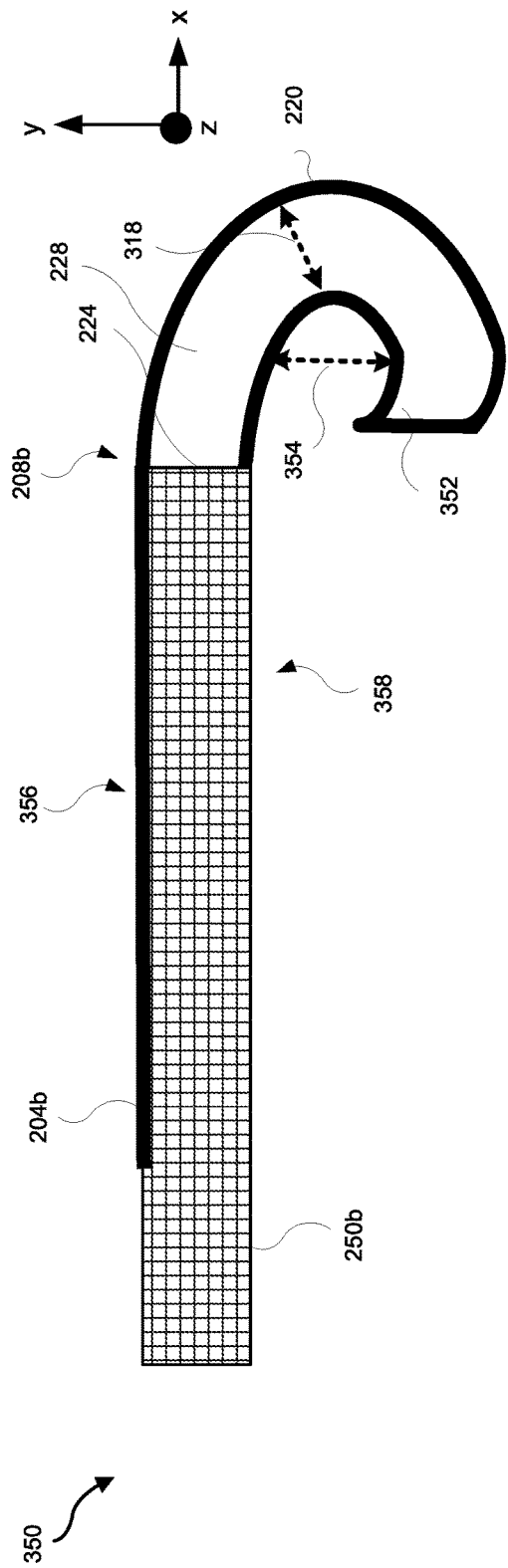
FIG. 3B is an illustration of a perspective view of another snap piece assembly.

FIG. 3B is an illustration of a perspective view 350 of the snap piece assembly 208b. Referring to FIG. 2, the perspective view 350 shows the top 220 of the snap piece assembly 208b and the top location 224 of the strap end snap piece 204b where the formed end 206b of the second portion 250b of the strap 202 is affixed to the strap end snap piece 204b. Referring to FIGS. 1 and 2, the perspective view 350 shows the outer edge 228 having an outer edge width 318 (e.g., the outer edge width 120 as shown in FIG. 1). The perspective view 350 shows a front side 356 and a back side 358 of the snap piece assembly 208b. The perspective view 350 may be a cross-sectional view of the snap piece assembly 208b.

A snap piece assembly may be coupled or attached to a connector dimensioned for interfacing with the snap piece assembly. Referring to the snap piece assembly 208a as shown in FIGS. 2 and 3A, the outer edge 218 of the strap end snap piece 204a may be of a formed end shaped to include a lip 302 of a width 304 that may be dimensioned to fit over, fit around, or snap around an outer edge of a connector. The outer edge of the connector may be a formed edge of the connector dimensioned and/or shaped to fit within the outer edge 218 of the strap end snap piece 204a. When the outer edge 218 of the strap end snap piece 204a is coupled to the edge of the connector, the snap piece assembly 208a may be attached, coupled, connected, or snapped onto the connector. Referring to the snap piece assembly 208b as shown in FIGS. 2 and 3B, the outer edge 228 of the strap end snap piece 204b may be of a formed end shaped to include a lip 352 of a width 354 that may be dimensioned to fit over, fit around, or snap around an outer edge of a connector. The outer edge of the connector may be a formed edge of the connector dimensioned and/or shaped to fit within the outer edge 228 of the strap end snap piece 204b. When the outer edge 228 of the strap end snap piece 204b is coupled to the edge of the connector, the snap piece assembly 208b may be attached, coupled, connected, or snapped onto the connector. Examples of connections of this type will be described herein and in particular with reference to FIGS. 5 and 6.

A snap piece assembly may be decoupled or detached from a connector dimensioned for interfacing with the snap piece assembly. Referring to the snap piece assembly 208a as shown in FIGS. 2 and 3A, once connected, the outer edge 218 of the strap end snap piece 204a may be decoupled, detached, disconnected, or unsnapped from the connector by removing the outer edge 218 of the strap end snap piece 204a from being position over or around the outer edge of the connector. Referring to the snap piece assembly 208b as shown in FIGS. 2 and 3B, once connected, the outer edge 228 of the strap end snap piece 204b may be decoupled, detached, disconnected, or unsnapped from the connector by removing the outer edge 228 of the strap end snap piece 204b from being positioned over or around the other formed end or lip of the connector. Examples of disconnections of this type will be described herein and in particular with reference to FIGS. 5 and 6.

A strap, when connected to one or more connectors included, attached, affixed, or otherwise incorporated into an object, a system, a device and/or an apparatus, may connect two objects, may connect two parts of a system, device, or apparatus, and/or may hold an object in place. A first snap piece assembly may be detachably coupled to a first connector of an object and a second snap piece assembly may be detachably coupled to a second connector of the object. The first connector may be dimensioned for interfacing with and connecting to the first snap piece assembly. The second connector may be dimensioned for interfacing with and connecting to the second snap piece assembly. For example, referring to FIGS. 5-15, a strap may be incorporated as part of a head-mounted display system that includes two connectors as side arms of the head-mounted display system. A strap of a head-mounted display system may provide the necessary connections to the side arms of the head-mounted display system facilitating the wearing of the head-mounted display system by a user.

Figure 4:
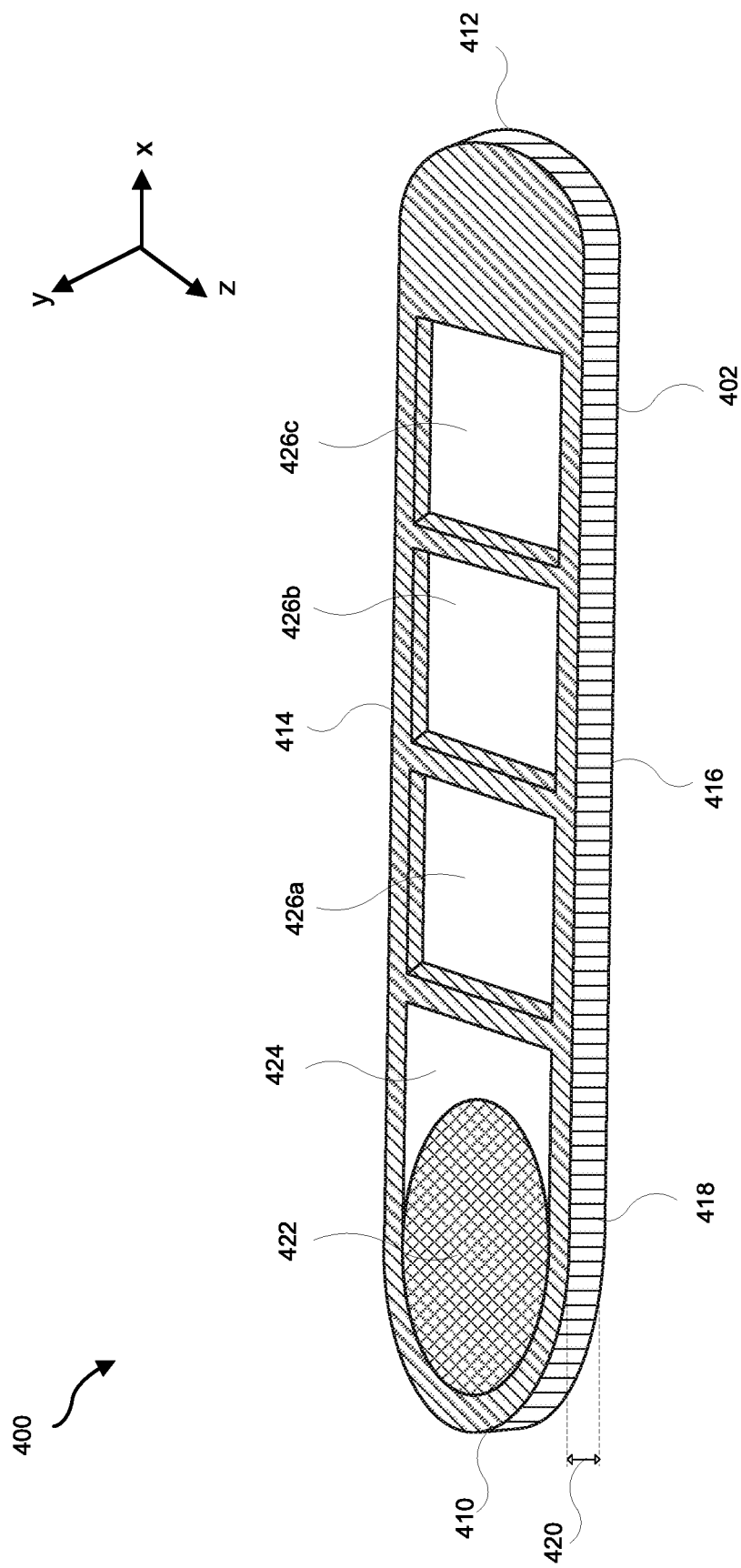
FIG. 4 is an illustration of a perspective view of a side arm of a head-mounted display system.

FIG. 4 is an illustration of a perspective view 400 of an example side arm 402 of a head-mounted display system. The side arm 402 may include an upper end 410, a lower end 412, a first side 414, and a second side 416. The side arm 402 may be surrounded by an outer edge 418 of a width 420. As described herein, and in particular with reference to FIGS. 2, 3A, and 3B, the outer edge 418 may be a formed edge of the side arm 402 dimensioned and/or shaped to fit within an outer edge (e.g., the outer edge 218 and/or the outer edge 228) of a strap end snap piece (e.g., the strap end snap piece 204a and/or the strap end snap piece 204b, respectively).

A side arm may function as a connector that may be detachably coupled to a snap piece assembly as described herein and in particular with reference to FIGS. 2, 3A, and 3B. The side arm 402 may be detachably coupled to a snap piece assembly. For example, the side arm 402 may be detachably coupled to the snap piece assembly 208a. The lip 302 of the snap piece assembly 208a may fit over, around, and/or may snap onto the outer edge 418 of the side arm 402, thereby coupling, connecting, or attaching the snap piece assembly 208a to the side arm 402. Additionally, or alternatively, the lip 352 of the snap piece assembly 208b may fit over, around, and may snap onto the outer edge 418 of the side arm 402, thereby coupling, connecting, or attaching the snap piece assembly 208b to the side arm 402. Additionally, or alternatively, the snap piece assembly 208a may be detachably coupled to the side arm 402 and the snap piece assembly 208b may be detachably coupled to another side arm similar to the side arm 402. Such examples will be shown with reference to FIGS. 5 to 12.

A side arm may be attached to a side of a head-mounted display system so as to surround, encompass, or house an electronic component 422 of the head-mounted display system. Referring to FIG. 4, the electronic component 422 may be an audio component that provides audio content to a user when the user dons or wears the head-mounted display system on a head of the user. In some implementations, the electronic component 422 may be an audio transducer configured to deliver or output audio content (e.g., sound). An audio transducer may perform the functions of an audio speaker. Examples of audio transducers may include, but are not limited to, voice coil speakers, ribbon speakers, electrostatic speakers, piezoelectric speakers, bone conduction transducers, cartilage conduction transducers, tragus-vibration transducers, and/or any other suitable type or form of audio transducer. In some implementations, the electronic component 422 may be a transducer that may be used for both audio input and audio output performing the functions of a speaker and a microphone.

The ends of a side arm may be implemented in a variety of configurations. In the example shown in FIG. 4, the upper end 410 and the lower end 412 of the side arm 402 may provide rounded ends to the side arm 402. In some implementations, an end of a side arm may be flat or squared-off (of a square shape). In some implementations, each end of a side arm may be formed or finished in the same way. For example, as shown if FIG. 4, the upper end 410 and the lower end 412 are both rounded ends. In some implementations, each end of a side arm may be formed differently. For example, an upper end of a side arm may be rounded, and a lower end of a side arm may be squared-off. In another example, an upper end of a side arm may be squared-off, and a lower end of a side arm may be rounded.

A side arm may be formed with one or more cut-out sections. For example, the side arm 402 may include cut-outs 426a-c. In addition, the side arm may include cut-out 424 dimensioned to accommodate the electronic component 422. The cut-outs 426a-c and the cut-out 424 may reduce a weight and/or a mass of the side arm 402. Referring to FIGS. 5-11, a reduced weight and/or mass of the side arm 402 may benefit an overall weight on a head-mounted display device, providing a lighter-weight more comfortable device for donning by a user. In some implementations, providing one or more cut-outs in a side arm may make the detachable coupling of a strap, and in particular snap end assemblies of a strap, to the side arms easier for the manufacturing and for a user of the head-mounted display system when attaching and detaching a strap from a body of the head-mounted display system, which will be described in more detail herein, and in particular with reference to FIGS. 5 and 8-12.

A side arm may be formed with a single cut-out area for accommodating an electronic component. For example, a side arm may include the cut-out 424 dimensioned to accommodate the electronic component 422. The remainder of the side arm may be a solid piece that may not include any cut outs. In these implementations, such a side arm may provide a sturdier, more rigid connection between a strap, and in particular a snap end piece of the strap and the head-mounted display system.

Figure 5:
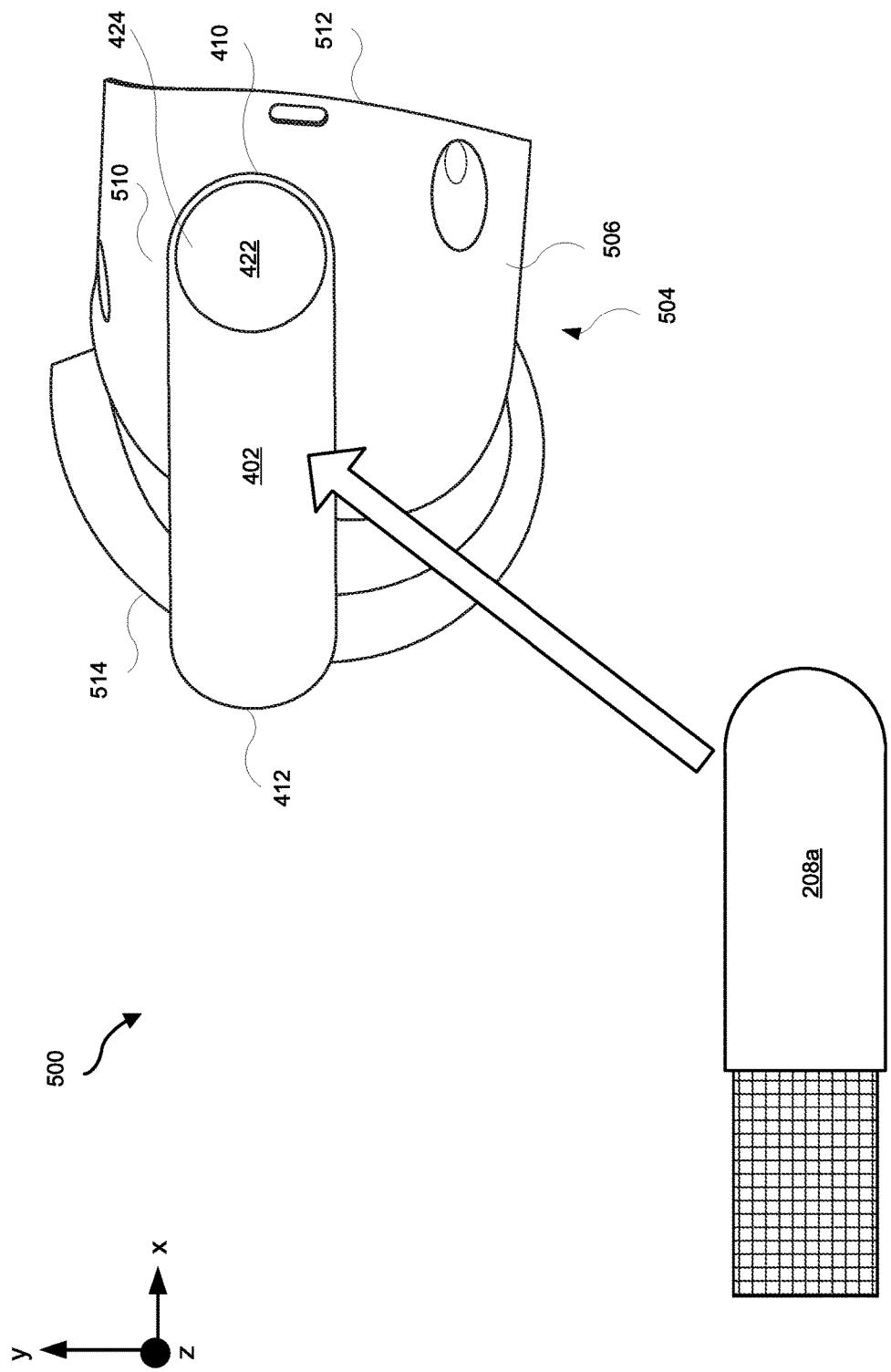
FIG. 5 is an illustration of a perspective view of a head-mounted display system.

FIG. 5 is an illustration of a perspective view 500 of a head-mounted display system 504. The perspective view 500 shows one side (e.g., a right side) of the head-mounted display system 504. Referring to FIG. 4, the side arm 402 may be attached, affixed, connected, or otherwise coupled to a body 506 of the head-mounted display system 504. The body 506 may include the electronic component 422. As described herein, and in particular with reference to FIGS. 2, 3A, 4, and 7-12, the snap piece assembly 208a may be connected to the side arm 402 connecting an end of the strap 202 to the body 506 of the head-mounted display system 504.

A side arm may be attached to a body of a head-mounted display system such that the side arm may extend toward a back of the side of the body. As described herein, and in particular with reference to FIGS. 4 and 5, the side arm 402 may be attached to the body 506 of the head-mounted display system 504 on a right side 510 of the body 506. The side arm 402 may be attached to the body 506 such that the upper end 410 of the side arm 402 and, in particular the cut out 424, is positioned over the electronic component 422 positioning the upper end 410 of the side arm 402 towards a front 512 of the right side 510 of the head-mounted display system 504 with the lower end 412 of the side arm 402 extending towards a back 514 of the right side 510 of the head-mounted display system 504.

Figure 6:
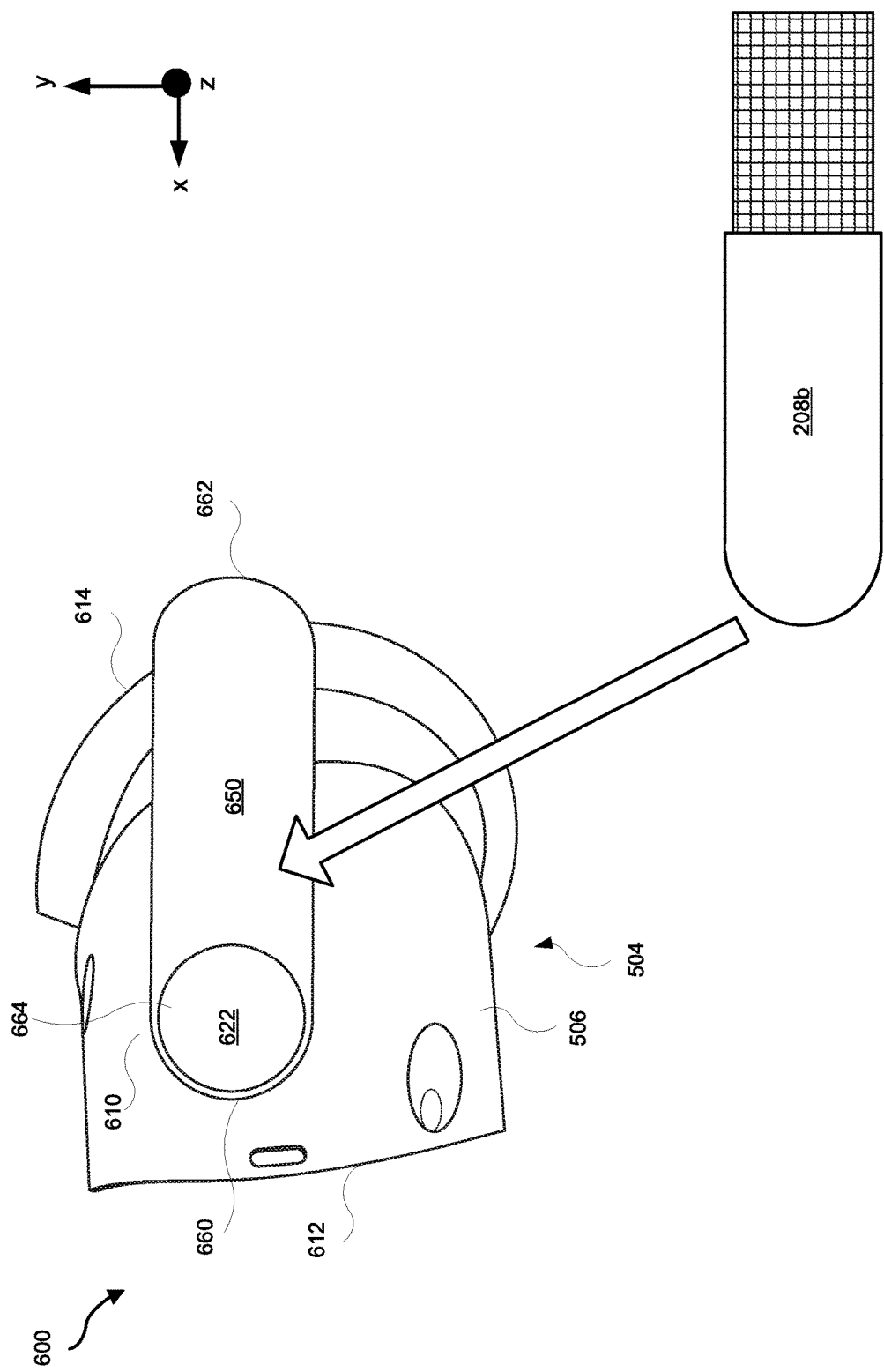
FIG. 6 is an illustration of another perspective view of a head-mounted display system.

FIG. 6 is an illustration of another perspective view 600 of the head-mounted display system 504. The perspective view 600 shows another side (e.g., a left side) of the head-mounted display system 504. A side arm 650 may be configured the same as the side arm 402. The side arm 650 may be attached, affixed, connected, or otherwise coupled to the body 506 of the head-mounted display system 504. The body 506 may include an electronic component 622. As described herein, and in particular with reference to FIGS. 2, 3B, 4, and 7-12, the snap piece assembly 208b may be connected to the side arm 650 connecting an end of the strap 202 to the body 506 of the head-mounted display system 504.

A side arm may be attached to a body of a head-mounted display system such that the side arm may extend toward a back of the side of the body. Referring to FIGS. 4 and 6, the side arm 650 may be attached to the body 506 of the head-mounted display system 504 on a left side 610 of the body 506. The side arm 650 may be attached to the body 506 such that an upper end 660 of the side arm 650 and, in particular a cutout 664, is positioned over the electronic component 622, thereby positioning an upper end 660 of the side arm 650 towards a front 612 of the left side 610 of the head-mounted display system 504 with a lower end 662 of the side arm 650 extending towards a back 614 of the left side 610 of the head-mounted display system 504.

Referring to FIG. 4, the electronic component 422 may be an audio component that provides audio content to a user when the user dons or wears the head-mounted display system on a head of the user. In some implementations, the electronic component 422 may be an audio transducer (e.g., a speaker) configured to deliver or output audio content. Examples of audio transducers may include, but are not limited to, voice coil speakers, ribbon speakers, electrostatic speakers, piezoelectric speakers, bone conduction transducers, cartilage conduction transducers, tragus-vibration transducers, and/or any other suitable type or form of audio transducer. In some implementations, the electronic component 422 may be a transducer that may be used for both audio input and audio output performing the functions of a speaker and a microphone. Alternatively, electronic component 422 may be configured to function only as a speaker.

Figure 7:
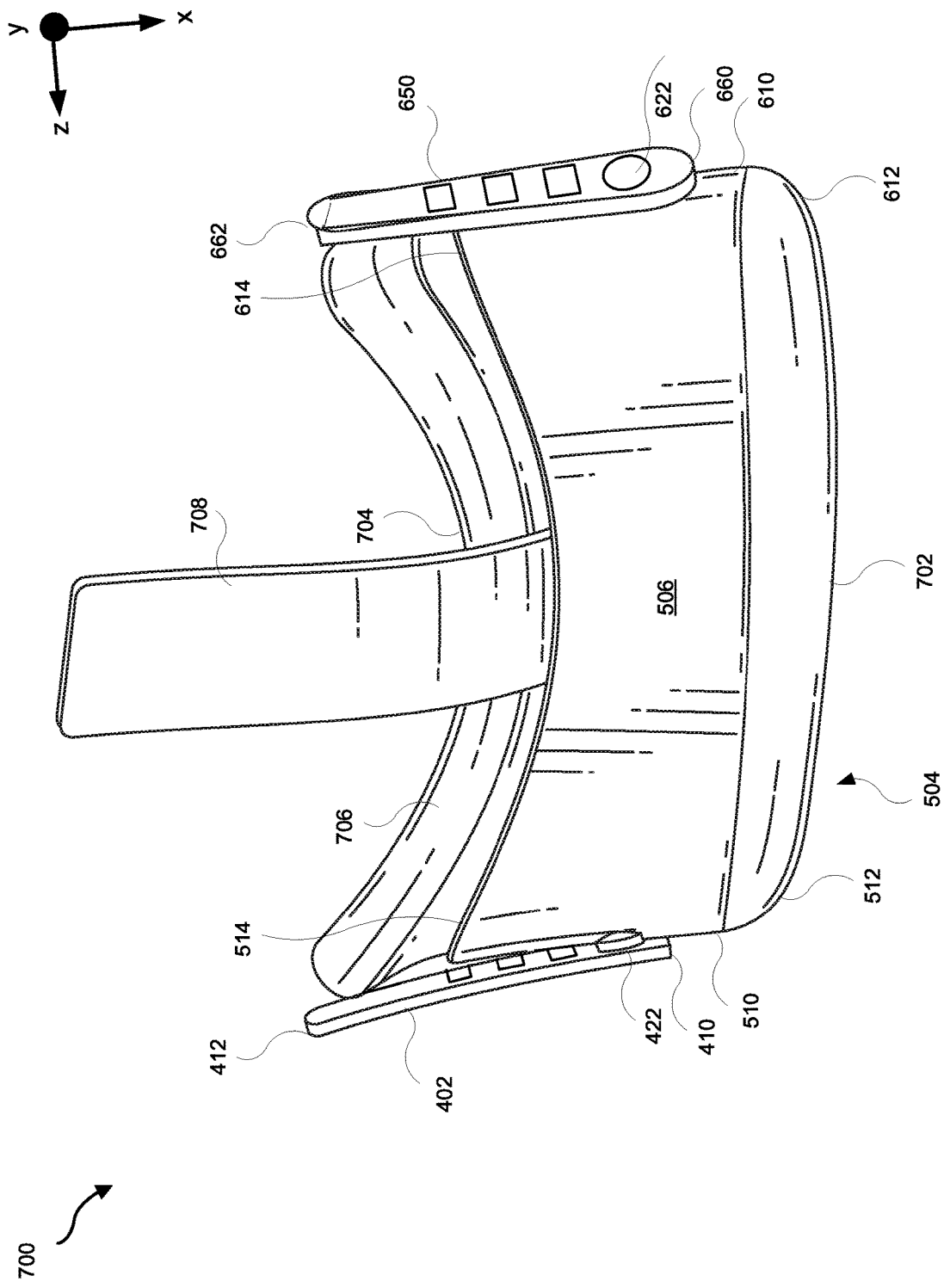
FIG. 7 is an illustration of a perspective view of an example body of a head-mounted display system.

FIG. 7 is an illustration of a perspective view 700 of an example body (e.g., the body 506 as shown in FIGS. 5 and 6) of a head-mounted display system (e.g., the head-mounted display system 504 as shown in FIGS. 5 and 6). The head-mounted display system 504 includes a facial interface cushion 706 and an upper strap 708. The body 506 includes a front 702 and a back 704. Referring to FIGS. 4, 5, and 6, the perspective view 700 shows a top view of the body 506 of the head-mounted display system 504 with a side arm (e.g., the side arm 402 and the side arm 650) attached to the right side 510 and the left side 610, respectively, of the body 506.

The head-mounted display system 504 may be worn by a user by placing the body 506 on a head of the user so that the body 506 completely covers a field of view of the user, and the facial interface cushion 706 rests comfortably against a region (e.g., a forehead) of a face of the user. When worn in this manner by the user, with the side arm 402 and the side arm 650 being located over the respective electronic component 422 and electronic component 622 located on the right side 510 and the left side 610, respectively, of the body 506, the body 506 of the head-mounted display system 504 may be positioned on the head of the user so that the lower end 412 of the side arm 402 extends towards the back 704 of the head-mounted display system 504 and specifically towards the back 514 of the right side 510 of the head-mounted display system 504, and that the lower end 662 of the side arm 650 extends towards the back 704 of the head-mounted display system 504 and specifically towards the back 614 of the left side 610 of the head-mounted display system 504.

FIGS. 8-12 show various perspective views of the connecting of a detachable strap system in a head-mounted display system. As described herein, and in particular with reference to FIGS. 2-7, a detachable strap system may include one or more straps or strap assemblies that may each include a snap piece assembly for connecting, coupling, attaching, or affixing to a respective one of side arms of a body of a head-mounted display system.

A detachable strap system may include one or more straps or strap assemblies. As described herein, and in particular with reference to FIGS. 8-12, a detachable strap system 850 may include the upper strap 708. In some implementations, the detachable strap system 850 may further include a left lower strap 854 and a right lower strap 856. An end of the right lower strap 856 may include the snap piece assembly 208a. An end of the right lower strap 856 may include the snap piece assembly 208b. In some implementations, the left lower strap 854 may be the one of the first portion 250a or the second portion 250b of the strap 202 and the right lower strap 856 may be the other of the first portion 250a or the second portion 250b of the strap 202.

A detachable strap system may facilitate the wearing of the head-mounted display system 504 by a user. For example, the detachable strap system 850 may be used to mount the body 506 of the head-mounted display system 504 on a head of a user. In some implementations, the detachable strap system 850 may adjustably conform to the top and/or sides of the head of the user when the user is wearing the head-mounted display system 504. In some embodiments, the detachable strap system 850 may include a back piece 852 that may be attached, connected, or otherwise coupled to the upper strap 708, the left lower strap 854, and the right lower strap 856. When worn by the user, the back piece 852 may rest against a back of the head of the user (e.g., around the occipital lobe of the user).

Figure 8:
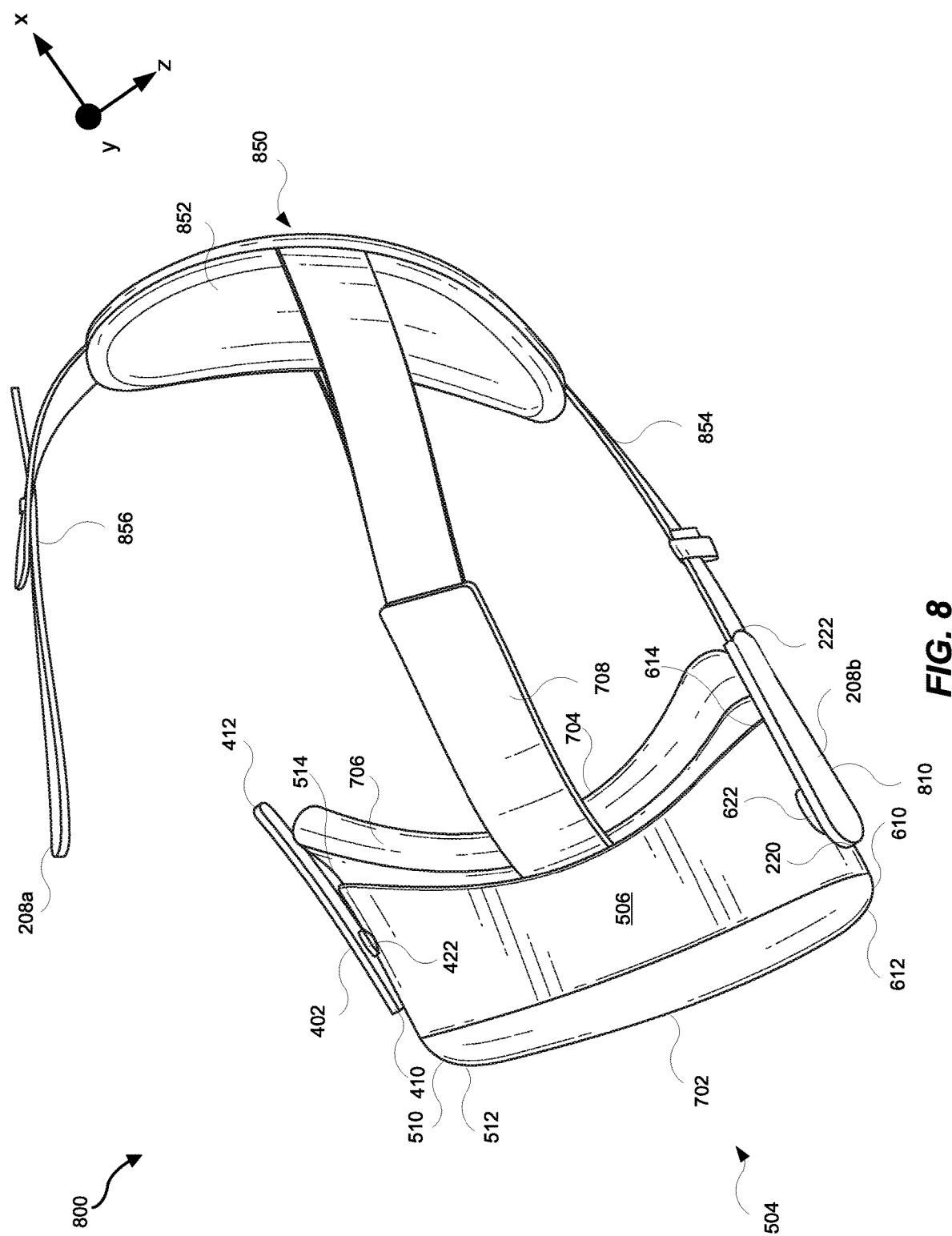
FIGS. 8-12 show various perspective views of the connecting of a detachable strap system in a head-mounted display system.

FIG. 8 is an illustration of a perspective 800 of connecting the detachable strap system 850 in the head-mounted display system 504. As shown in FIG. 8, the snap piece assembly 208b is attached, connected, or snapped onto the side arm 650 on the left side 610 of the body 506 of the head-mounted display system 504 forming a fastener 810. The snap piece assembly 208a has yet to be coupled to the side arm 402 on the right side 510 of the body 506.

Figure 9:
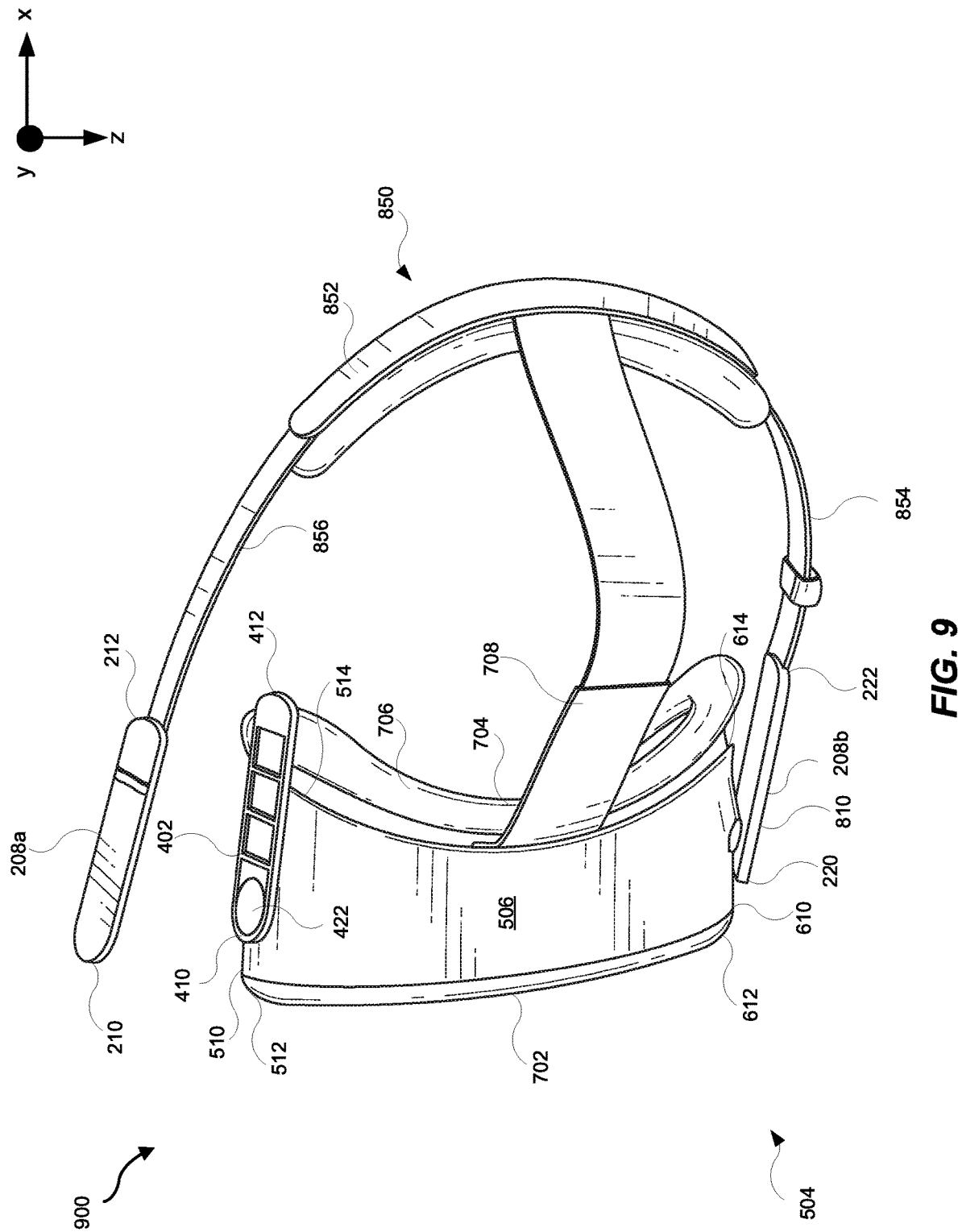

FIG. 9 is an illustration of another perspective 900 of connecting the detachable strap system 850 in the head-mounted display system 504. As shown in FIG. 9, the snap piece assembly 208b is attached, connected, or snapped onto the side arm 650 on the left side 610 of the body 506 of the head-mounted display system 504. The snap piece assembly 208a has yet to be coupled to the side arm 402 on the right side 510 of the body 506. The snap piece assembly 208a is being placed in a position over the side arm 402 for detachably coupling (e.g., connecting) the snap piece assembly 208a to the side arm 402.

Figure 10:
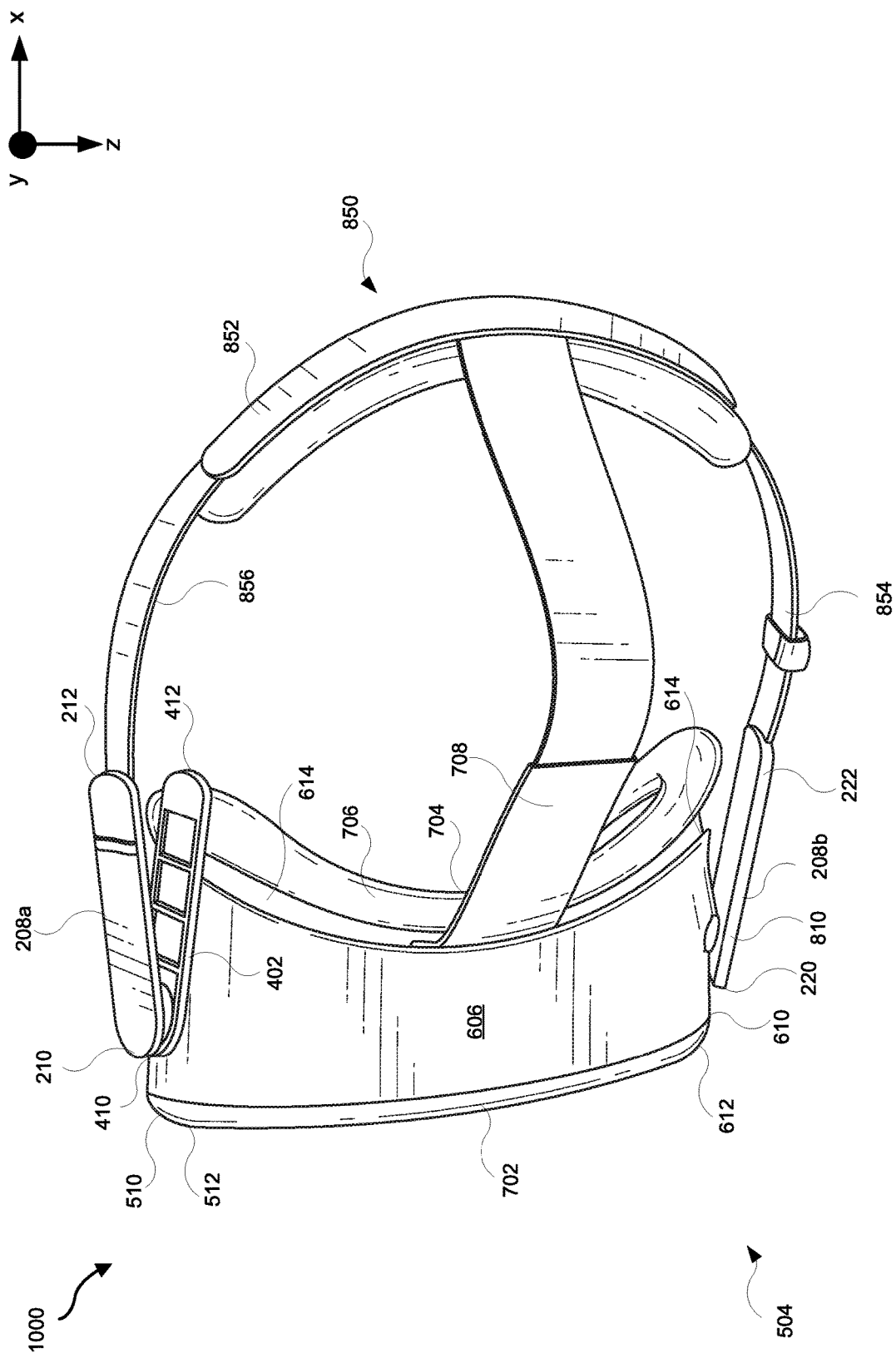

FIG. 10 is an illustration of another perspective 1000 of connecting a detachable strap system 850 in the head-mounted display system 504. As shown in FIG. 10, the snap piece assembly 208b is attached, connected, or snapped onto the side arm 650 on the left side 610 of the body 506 of the head-mounted display system 504. The top 210 of the snap piece assembly 208a may be positioned or placed over the upper end 410 of the side arm 402. The top 210 of the snap piece assembly 208a may be positioned over the upper end 410 such that the lip 302 of the strap end snap piece 204a may fit over or around the outer edge 418 of the side arm 402 at the upper end 410 of the side arm 402.

Figure 11:
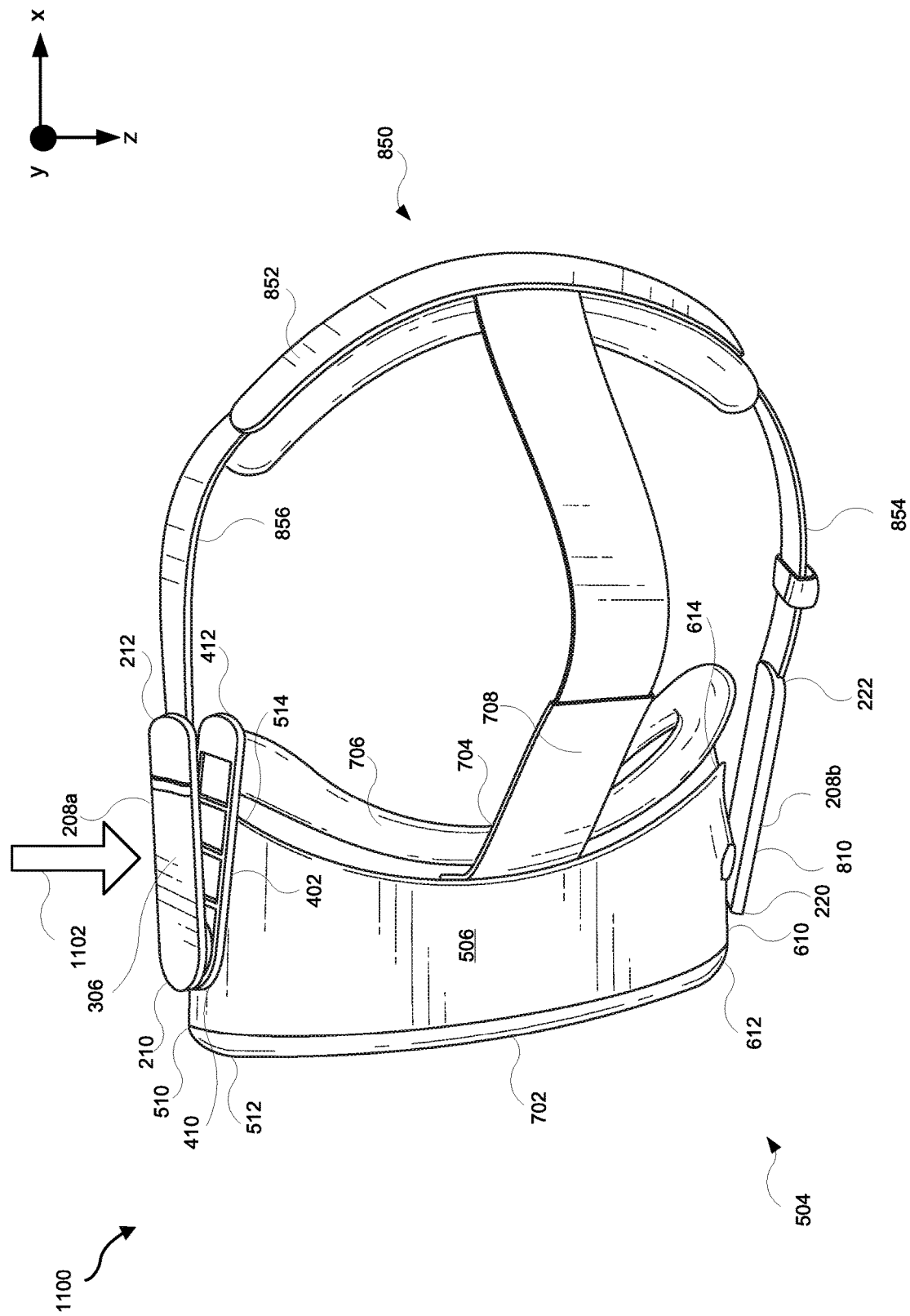

FIG. 11 is an illustration of another perspective 1100 of connecting a detachable strap system 850 in the head-mounted display system 504. As shown in FIG. 11, the snap piece assembly 208b is attached, connected, or snapped onto the side arm 650 on the left side 610 of the body 506 of the head-mounted display system 504. The top 210 of the snap piece assembly 208a is positioned or placed over the upper end 410 of the side arm 402. The bottom 212 of the snap piece assembly 208a may be positioned further over the lower end 412.

A downward force may be applied to a snap piece assembly appropriately positioned on a side arm of a head-mounted display system, snapping the snap piece assembly onto the side arm and attaching an end of a strap to the side arm. For example, a force, as shown by arrow 1102, may be applied in a downward direction on the front side 306 of the snap piece assembly 208a. The application of the force may further attach, couple, connect, or snap the lip 302 of the strap end snap piece 204a over or around the outer edge 418 of the side arm 402.

The snapping of a snap piece assembly to a side arm may be performed in a way similar to the snapping of a lid onto a container. For example, the lip 302 of the snap piece assembly 208a may fit over and around the outer edge 418 of the side arm 402. Once positioned, a downward force, as shown for example by arrow 1102, applied to the front side 306 of the snap piece assembly 208a may assist in snapping the snap piece assembly 208a onto the side arm 402.

Figure 12:
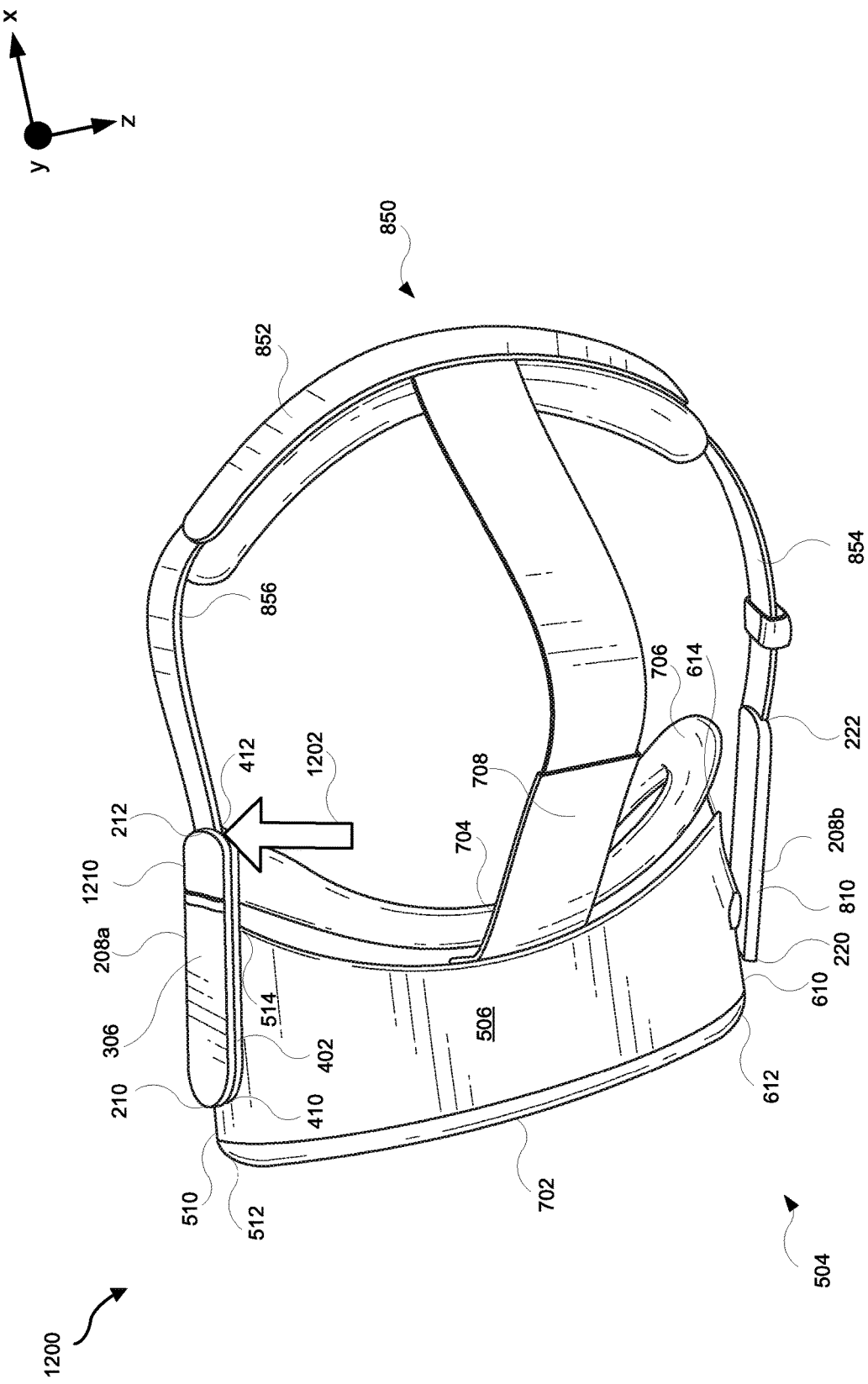

FIG. 12 is an illustration of another perspective 1200 of connecting a detachable strap system 850 in the head-mounted display system 504. As shown in FIG. 12, the snap piece assembly 208b is attached, connected, or snapped onto the side arm 650 on the left side 610 of the body 506 of the head-mounted display system 504. As shown in FIG. 12, the snap piece assembly 208a is completely attached, connected, or snapped onto the side arm 402 on the right side 510 of the body 506 of the head-mounted display system 504 forming a fastener 1210. The detachable strap system 850 is attached to the body 506 of the head-mounted display system 504.

A snap piece assembly may be detached, disconnected, or unsnapped from a side arm of a head-mounted display system. As described herein, and in particular with reference to FIGS. 8-12, an upward force (as shown by arrow 1202) applied to the bottom 212 of the snap piece assembly 208a may assist in unsnapping the snap piece assembly 208a from the side arm 402, resulting in the positioning of the snap piece assembly 208b in relation to the side arm 402 as shown, for example, in FIG. 10. In some implementations, the snap piece assembly 208a may be further detached, disconnected, or unsnapped from the side arm 402 by moving the snap piece assembly 208a such that the lip 302 of the strap end snap piece 204a is no longer fitted over or around the outer edge 418 of the side arm 402 at the upper end 410 of the side arm 402. Doing so may completely detach, disconnect, and/or unsnap the snap piece assembly 208b from the side arm 402 as shown, for example, in FIG. 9.

A fastener may join, affix, or attach two or more items or objects to one another. The attaching may be accomplished by a mechanical connection that allows for a non-permanent connection between the two or more objects. A joining of the two or more objects created by the fastener may be disjoined, disconnected, or dismantled without any damage to the components used for joining the two or more objects to one another. As such, the two or more objects may be attached and detached from one another. In addition, or in the alternative, different objects dimensioned for mechanical connection to one another may be swappably connected and disconnected without incurring any damage to the components used for joining the two or more objects to one another.

As described herein, fasteners may provide for the detachable connection of a swappable strap to a body of a head-mounted display device. For example, with reference to FIGS. 8-12, the fastener 810 and the fastener 1210 may provide a detachable connection of the detachable strap system 850 to the side arm 402 and the side arm 650 of the body 506 of the head-mounted display system 504. The ability to provide a detachable connection of a strap system to a head-mounted display device may allow for the swapping of strap systems that may be connected to a particular head-mounted display device.

Each snap piece assembly of a strap may be considered a hard goods (or hardgoods) assembly. As described herein, and in particular with reference to FIGS. 2, 3A, 3B, and 5-12, each formed end 206a-b of the strap 202 may be affixed to a respective strap end snap piece 204a-b resulting in snap piece assemblies 208a-b, respectively. Each snap piece assembly 208a-b may provide a hardness, rigidity, or stiffness to each end of the strap 202. As such, the detachable strap system 850 that includes the snap piece assemblies 208a-b may be considered a hard goods assembly for connecting to the body 506 of the head-mounted display system 504.

As described herein, a side arm may be attached to a side of a head-mounted display system to surround, encompass, or house an electronic component (e.g., an audio component) of the head-mounted display system. The side arm may function as a connector that may be detachably coupled to a snap piece assembly. When the side arm is connected to the snap piece assembly, output from the electronic component may be directed to a user wearing the head-mounted display system. Each electronic component 422 and 622 may be placed over a respective ear of a user when the head-mounted display system is worn by a user. For example, as described herein and in particular with reference to FIGS. 2, 3A, 3B, and 5-12, the side arm 402 may be detachably coupled to the snap piece assembly 208a and the side arm 650 may be detachably coupled to the snap piece assembly 208b. The electronic component 422 and the electronic component 622 may each be audio output components (e.g., speakers). The snap piece assembly 208a, when attached to the side arm 402, may be dimensioned to cover the electronic component 422 and to direct sounds waves from the electronic component 422 to an ear of a user. The snap piece assembly 208b, when attached to the side arm 650, may be dimensioned to cover the electronic component 622 and to direct sounds waves from the electronic component 622 to another ear of the user.

Figure 13:
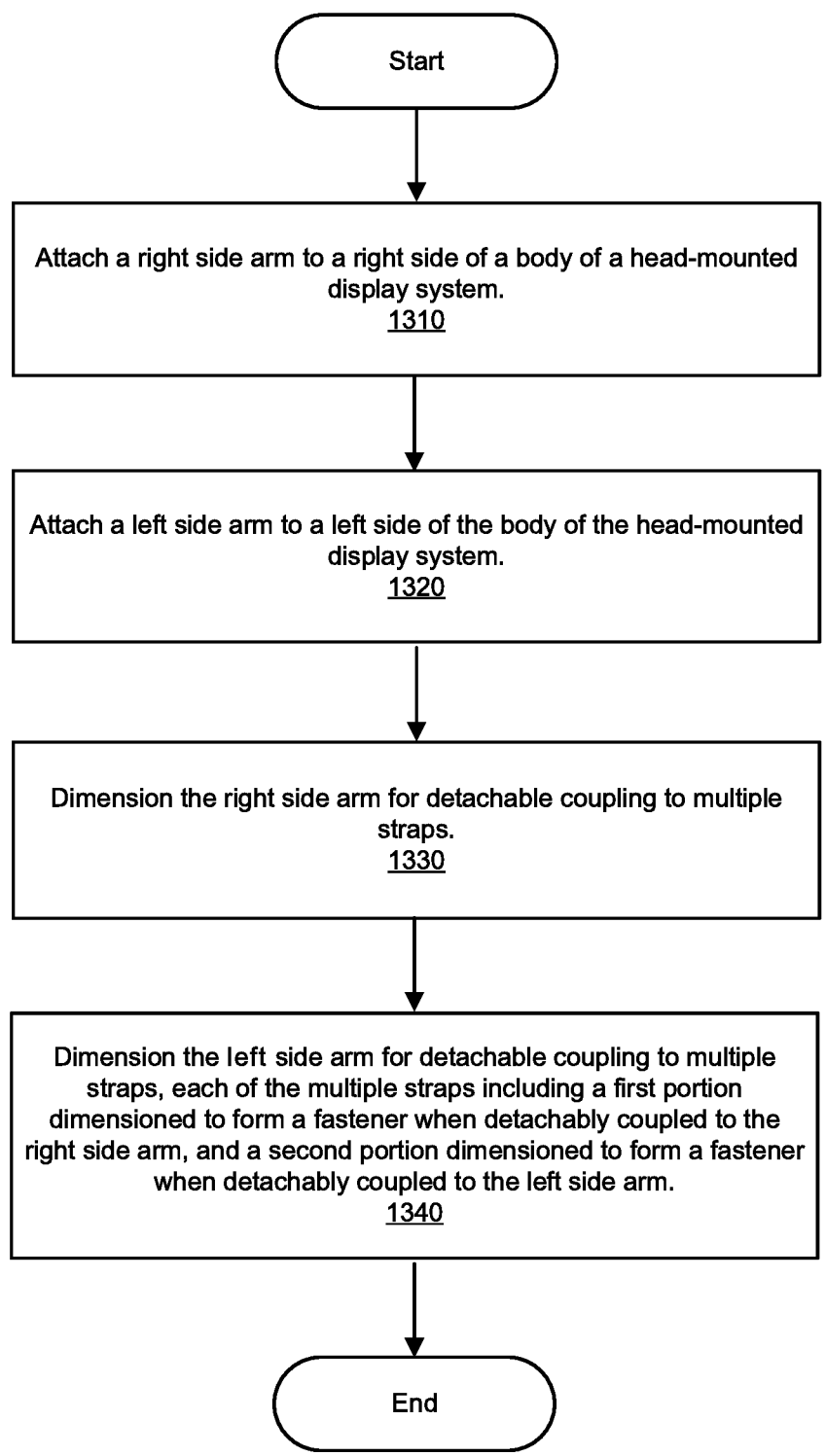
FIG. 13 is a flow diagram of an exemplary method for manufacturing, assembling, using, adjusting, or otherwise configuring or creating a body of a head-mounted display system for detachable connection to detachable strap assemblies

FIG. 13 is a flow diagram of an exemplary method 1300 for manufacturing, assembling, using, adjusting, or otherwise configuring or creating a body of a head-mounted display system for detachable connection to detachable strap assemblies. The steps shown in FIG. 13 may be performed by an individual and/or by any suitable manual and/or automated apparatus. In one example, each of the steps shown in FIG. 13 may represent a process that may be represented by multiple sub-steps, examples of which will be provided in greater detail below.

As illustrated in FIG. 13, at step 1310 one or more of the systems described herein may attach a right side arm to a right side of a body of a head-mounted display system. A side arm may be attached, affixed, connected, or otherwise coupled to the body of the head-mounted display system. For example, with reference to FIGS. 4, 5, and 7-12, the side arm 402 may be the right side arm attached to the right side 510 of the body 506 of the head-mounted display system 504.

In some embodiments, the term "head-mounted display system" may refer to an artificial-reality system that presents to a user a form of reality that has been adjusted in some manner before presentation to a user. Examples of head-mounted display systems may include, without limitation, augmented reality systems, virtual reality systems, head-worn display systems, virtual reality headsets, head-mounted display devices, and headsets. A head-mounted display system may be any type or form of display device or system that is worn on or about a head of a user that may display visual content to the user. A head-mounted display system may display content in any suitable manner using, including, but not limited to, a screen (e.g., a liquid crystal display (LCD) screen or a light-emitting diode (LED) screen), a projector, or an optical mixer. A head-mounted display system may display content in one or more of various media formats. For example, a head-mounted display may display video, photos, and/or computer-generated imagery (CGI).

A head-mounted display system may provide diverse and distinctive user experiences. Some head-mounted display systems may provide virtual-reality experiences (i.e., they may display computer-generated or pre-recorded content), while other head-mounted display systems may provide real-world experiences (i.e., they may display live imagery from the physical world). A head-mounted display system may also provide any mixture of live and virtual content. For example, virtual content may be projected onto the physical world (e.g., via optical or video see-through), which may result in augmented reality or mixed reality experiences.

In some embodiments, the term "attach" may refer the securing of one object to another object in order to keep the two objects together. Examples of attaching may include, without limitation, connecting, affixing, fastening, securing, bonding, gluing, tying, nailing, or linking of one object to another. In some cases, the attaching of two objects may result in one object staying firmly in place as related to the other object.

The systems described herein may perform step 1310 in a variety of ways. In one example, with reference to FIGS. 5 and 7-12, the side arm 402 may be attached, affixed, connected, or otherwise coupled to the right side 510 of the body 506 of the head-mounted display system 504.

As illustrated in FIG. 13, at step 1320 one or more of the systems described herein may attach the left side arm to a left side of the body of the head-mounted display system. A side arm may be attached, affixed, connected, or otherwise coupled to the body of the head-mounted display system. For example, referring to FIGS. 6-12, the side arm 650 may be the left side arm attached to the left side 610 of the body 506 of the head-mounted display system 504.

The systems described herein may perform step 1320 in a variety of ways. In one example, the side arm 650 may be attached, affixed, connected, or otherwise coupled to the left side 610 of the body 506 of the head-mounted display system 504. As illustrated in FIG. 13, at step 1330 one or more of the systems described herein may dimension the right side arm for detachable coupling to multiple straps. For example, referring to FIGS. 4, 5, and 7-12, the side arm 402 may be the right side arm. The right side arm may be detachably coupled to a snap piece assembly of a detachable strap system. For example, the side arm 402 may be detachably coupled to the snap piece assembly 208a of the detachable strap system 850.

In some embodiments, the term "detachable" may refer to designing an item, object, or device so that it may be detached from another item, object, or device. Doing so allows one item to be removed or separated from another item. For example, the side arm 402 may be designed by dimensioning the side arm 402 for removal or separation from the snap piece assembly 208a.

In some embodiments, the term "strap" may refer to a narrow piece or strip of a flexible material or fabric that may be used to tie, connect, or attach one object to another. A strap may be included in a detachable strap assembly (e.g., the detachable strap assembly 850 as shown in FIGS. 8-12. The strap may be shaped and/or adjusted to fit around a head of a user when the user is wearing the head-mounted display system 504.

Step 1330 may be performed in a variety of ways. In one example, the side arm 402 may be surrounded by an outer edge 418 dimensioned and/or shaped to fit within the outer edge 218 of the strap end snap piece 204a included in the snap piece assembly 208a.

As illustrated in FIG. 13, at step 1340 one or more of the systems described herein may dimension a left side arm for detachable coupling to multiple straps. Each of the multiple straps may include a first portion dimensioned to form a fastener when detachably coupled to the right side arm, and a second portion dimensioned to form a fastener when detachably coupled to the left side arm. For example, referring to FIGS. 6-12, the side arm 650 may be the left side arm. The left side arm may be detachably coupled to a snap piece assembly of a detachable strap system. For example, the side arm 650 may be detachably coupled to the snap piece assembly 208b of the detachable strap system 850 forming the fastener 810. The side arm 402 may be detachably coupled to the snap piece assembly 208a of the detachable strap system 850 forming the fastener 1210. Referring to FIG. 2, the strap 202 may include the first portion 250a and the second portion 250b including the formed ends 206a-b, respectively, that may be affixed to a respective strap end snap piece 204a-b, resulting in snap piece assemblies 208a-b, respectively. Each snap piece assembly 208a-b may be dimensioned to form a fastener when detachably coupled to the respective side arm 402 and side arm 650.

In some embodiments, the term "fastener" may refer to mechanical connection that may join, affix, or attach two objects to one another (e.g., a body of a head-mounted display device to a portion of a strap). The fastener may provide a non-permanent connection between the two objects (e.g., the body of a head-mounted display device and the portion of the strap) that may be disconnected without damaging any of the components (e.g., a side arm, the portion of the strap) used to connect the two objects. The two objects (e.g., the body of a head-mounted display device and the portion of the strap) may be attached and detached from one another.

Step 1340 may be performed in a variety of ways. In one example, the side arm 650 may be surrounded by an outer edge dimensioned and/or shaped to fit within the outer edge 228 of the strap end snap piece 204b included in the snap piece assembly 208b.

Including side arms on each side of a body of a first head-mounted display system that are dimensioned to be detachably coupled to a respective snap piece assembly included on each end of a detachable strap system may allow the detachable strap system to be attached and detached from the body of the first head-mounted display system. Dimensioning the side arms on bodies of other head-mounted display systems as dimensioned for the first head-mounted display system allows the other head-mounted display systems to be detachably coupled to the respective snap piece assembly included on each end of the detachable strap system. This provides the advantage of being able to use a single detachable strap assembly on multiple head-mounted display systems.

Including snap piece assemblies on each end of a first detachable strap system that are dimensioned to be detachably coupled to a respective side arm included on each side of a body of head-mounted display system may allow the first detachable strap system to be to be detachably coupled to the respective side arms of the head-mounted display system. Dimensioning snap piece assemblies of other detachable strap systems as dimensioned for the first detachable strap system allows the other detachable strap systems to be detachably coupled to the respective side arms included on the head-mounted display system. This provides the advantage of the use of a multiple detachable strap assemblies on a single head-mounted display systems providing the advantage for the body of the head-mounted display system to be configured to connect to more than one type of strap.

The ability to easily attach a detachable strap assembly to and detach a detachable strap assembly from a body of a head-mounted display system may ease manufacturing constraints for the head-mounted display system. In addition, or in the alternative, it may be more desirable for a user of the head-mounted display system to detach a detachable strap assembly from the body, adjust the detachable strap assembly for a secure and comfortable fit, and then to re-attach the detachable strap assembly to the body of the head-mounted display system.

EXAMPLE EMBODIMENTS

Example 1: A method may include attaching a right side arm to a right side of a body of a head-mounted display system, attaching a left side arm to a left side of the body of the head-mounted display system, dimensioning the right side arm for detachable coupling to multiple straps, and dimensioning the left side arm for detachable coupling to the multiple straps. Each of the multiple straps may include a first portion dimensioned to form a fastener when detachably coupled to the right side arm, and a second portion dimensioned to form a fastener when detachably coupled to the left side arm.

Example 2: The method of Example 1, where the first portion of each of the multiple straps may include a first snap piece assembly having a first strap end snap piece affixed to a first end of the strap and dimensioned to snap around the right side arm, and a second portion of each of the multiple straps may include a second snap piece assembly having a second strap end snap piece affixed to a second end of the strap and dimensioned to snap around the left side arm.

Example 3: The method of Examples 1 and 2, where the right side arm may include a right arm outer edge dimensioned to fit within an outer edge of the first snap piece assembly, and the left side arm may include a left arm outer edge dimensioned to fit within an outer edge of the second snap piece assembly.

Example 4: The method of any of Examples 1-3, where a lip of the outer edge of the first snap piece assembly may be dimensioned for detachably coupling to the right arm outer edge by fitting over the right arm outer edge, and a lip of the outer edge of the second snap piece assembly may be dimensioned for detachably coupling to the left arm outer edge by fitting over the left arm outer edge.

Example 5: The method of any of Examples 1-4, further including housing an electronic component within at least one of the right side arm or the left side arm.

Example 6: The method of any of Examples 1-5, where the electronic component may include an audio transducer.

Example 7: The method of any of Examples 1-6, where the right side arm may extend towards a back of the right side of the body, and the left side arm may extend towards a back of the left side of the body.

Example 8: A head-mounted display system may include a body having a right side and a left side, a display device coupled to the body such that, when the head-mounted display system is donned by a user, the display device is positioned to display content to the user, a right side arm coupled to the right side of the body, the right side arm being dimensioned such that, when coupled to a first portion of a swappable strap, the right side arm and the first portion of the strap form a first fastener, and a left side arm coupled to the left side of the body, the left side arm being dimensioned such that, when coupled to a second portion of the strap, the left side arm and the second portion of the strap form a second fastener. The first fastener and the second fastener detachably secure the strap to the body of the head-mounted display system.

Example 9: The head-mounted display system of Example 8, where the first portion of the strap may include a first snap piece assembly having a first strap end snap piece affixed to a first end of the strap and dimensioned to snap around the right side arm, and the second portion of the strap may include a second snap piece assembly having a second strap end snap piece affixed to a second end of the strap and dimensioned to snap around the left side arm.

Example 10: The head-mounted display system of Examples 8 and 9, where the right side arm may include a right arm outer edge dimensioned to fit within an outer edge of the first snap piece assembly, and the left side arm may include a left arm outer edge dimensioned to fit within an outer edge of the second snap piece assembly.

Example 11: The head-mounted display system of any of Examples 8-10, where a lip of the outer edge of the first snap piece assembly may be dimensioned for detachably coupling to the right arm outer edge by fitting over the right arm outer edge, and a lip of the outer edge of the second snap piece assembly may be dimensioned for detachably coupling to the left arm outer edge by fitting over the left arm outer edge.

Example 12: The head-mounted display system of any of Examples 8-11, further including an electronic component housed within at least one of the right side arm or the left side arm.

Example 13: The head-mounted display system of any of Examples 8-12, where the electronic component comprises an audio transducer.

Example 14: The head-mounted display system of any of Examples 8-13, where the audio transducer may include a speaker, and at least one of the right side arm or the left side arm may be dimensioned to direct sound waves generated by the speaker toward an ear of the user.

Example 15: The head-mounted display system of any of Examples 8-14, where the right side arm may extend towards a back of the right side of the body, and the left side arm may extend towards a back of the left side of the body.

Example 16: The head-mounted display system of any of Examples 8-15, where the swappable strap may be one of a plurality of swappable straps, and each of the plurality of swappable straps may include a first portion and a second portion for coupling to the right side arm and the left side arm, respectively, to form fasteners for individually detachably securing each of the plurality of swappable straps.

Example 17: A strap may include a first portion including a first assembly dimensioned such that, when coupled to a right side arm of a body of a head-mounted display system included in a plurality of head-mounted display systems, forms a first fastener by fitting a lip of an outer edge of the first assembly over an outer edge of the right side arm, and a second portion including a second assembly dimensioned such that, when coupled to a left side arm of the body of the head-mounted display system, forms a second fastener by fitting a lip of an outer edge of the second assembly over an outer edge of the left side arm, the strap configured for connection to each of the plurality of head-mounted display systems by forming respective first fasteners and second fasteners that detachably secure the strap to the body of a respective head-mounted display system.

Example 18: The strap of Example 17, where the first assembly may include a first strap end snap piece affixed to a first end of the strap and dimensioned to fit around the respective right arm of each of the plurality of head-mounted display systems, and the second assembly may include a second strap end snap piece affixed to a second end of the strap and dimensioned to fit around the respective left arm of each of the plurality of head-mounted display systems.

Example 19: The strap of Examples 17 and 18, where the first strap end snap piece may be affixed to the first end of the strap using a thermal adhesive, and the second strap end snap piece may be affixed to the second end of the strap using the thermal adhesive.

Example 20: The strap of any of Examples 17-19, where the first snap piece assembly and the second snap piece assembly may include a hard goods assembly.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1400 in FIG. 14) or that visually immerses a user in an artificial reality (such as, e.g., virtual-reality system 1500 in FIG. 15). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 14:
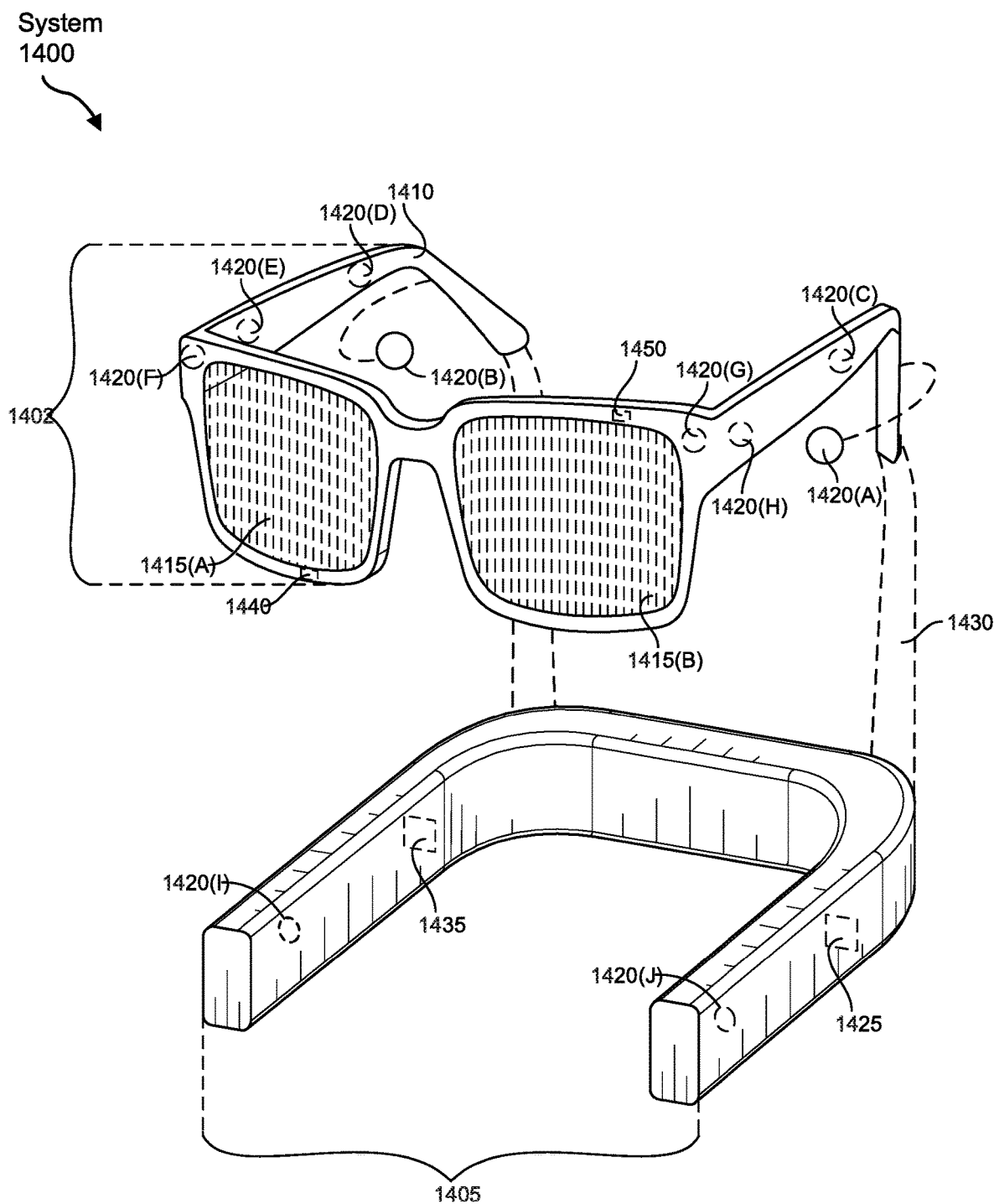
FIG. 14 is an illustration of exemplary augmented-reality glasses that may be used in connection with embodiments of this disclosure.
Figure 15:
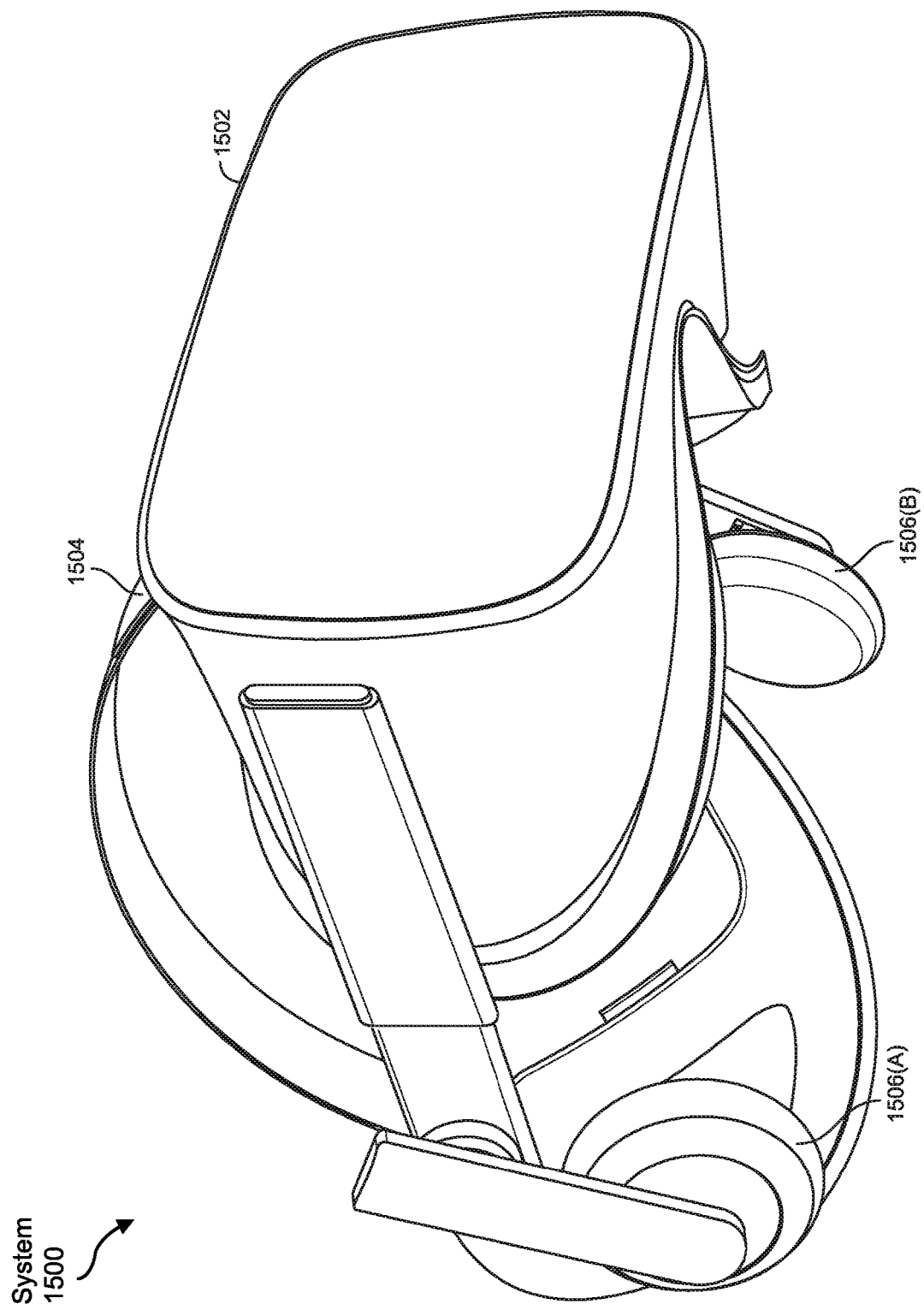
FIG. 15 is an illustration of an exemplary virtual-reality headset that may be used in connection with embodiments of this disclosure.

Turning to FIG. 14, augmented-reality system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While augmented-reality system 1400 includes two displays, embodiments of this disclosure may be implemented in augmented-reality systems with a single NED or more than two NEDs.

In some embodiments, augmented-reality system 1400 may include one or more sensors, such as sensor 1440. Sensor 1440 may generate measurement signals in response to motion of augmented-reality system 1400 and may be located on substantially any portion of frame 1410. Sensor 1440 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof.

In some examples, augmented-reality system 1400 may also include a microphone array with a plurality of acoustic transducers 1420(A)-1420(J), referred to collectively as acoustic transducers 1420. Acoustic transducers 1420 may represent transducers that detect air pressure variations induced by sound waves. Each acoustic transducer 1420 may be configured to detect sound and convert the detected sound into an electronic format (e.g., an analog or digital format). The microphone array in FIG. 15 may include, for example, ten acoustic transducers: 1420(A) and 1420(B), which may be designed to be placed inside a corresponding ear of the user, acoustic transducers 1420(C), 1420(D), 1420(E), 1420(F), 1420(G), and 1420(H), which may be positioned at various locations on frame 1410, and/or acoustic transducers 1420(I) and 1420(J), which may be positioned on a corresponding neckband 1405.

In some embodiments, one or more of acoustic transducers 1420(A)-(F) may be used as output transducers (e.g., speakers). For example, acoustic transducers 1420(A) and/or 1420(B) may be earbuds or any other suitable type of headphone or speaker.

The configuration of acoustic transducers 1420 of the microphone array may vary. While augmented-reality system 1400 is shown in FIG. 14 as having ten acoustic transducers 1420, the number of acoustic transducers 1420 may be greater or less than ten. In some embodiments, using higher numbers of acoustic transducers 1420 may increase the amount of audio information collected and/or the sensitivity and accuracy of the audio information. In contrast, using a lower number of acoustic transducers 1420 may decrease the computing power required by an associated controller 1450 to process the collected audio information. In addition, the position of each acoustic transducer 1420 of the microphone array may vary. For example, the position of an acoustic transducer 1420 may include a defined position on the user, a defined coordinate on frame 1410, an orientation associated with each acoustic transducer 1420, or some combination thereof.

Acoustic transducers 1420(A) and 1420(B) may be positioned on different parts of the user's ear, such as behind the pinna, behind the tragus, and/or within the auricle or fossa. Or, there may be additional acoustic transducers 1420 on or surrounding the ear in addition to acoustic transducers 1420 inside the ear canal. Having an acoustic transducer 1420 positioned next to an ear canal of a user may enable the microphone array to collect information on how sounds arrive at the ear canal. By positioning at least two of acoustic transducers 1420 on either side of a user's head (e.g., as binaural microphones), augmented-reality device 1400 may simulate binaural hearing and capture a 3D stereo sound field around about a user's head. In some embodiments, acoustic transducers 1420(A) and 1420(B) may be connected to augmented-reality system 1400 via a wired connection 1430, and in other embodiments acoustic transducers 1420(A) and 1420(B) may be connected to augmented-reality system 1400 via a wireless connection (e.g., a Bluetooth connection). In still other embodiments, acoustic transducers 1420(A) and 1420(B) may not be used at all in conjunction with augmented-reality system 1400.

Acoustic transducers 1420 on frame 1410 may be positioned in a variety of different ways, including along the length of the temples, across the bridge, above or below display devices 1415(A) and 1415(B), or some combination thereof. Acoustic transducers 1420 may also be oriented such that the microphone array is able to detect sounds in a wide range of directions surrounding the user wearing the augmented-reality system 1400. In some embodiments, an optimization process may be performed during manufacturing of augmented-reality system 1400 to determine relative positioning of each acoustic transducer 1420 in the microphone array.

In some examples, augmented-reality system 1400 may include or be connected to an external device (e.g., a paired device), such as neckband 1405. Neckband 1405 generally represents any type or form of paired device. Thus, the following discussion of neckband 1405 may also apply to various other paired devices, such as charging cases, smart watches, smart phones, wrist bands, other wearable devices, hand-held controllers, tablet computers, laptop computers, other external compute devices, etc.

As shown, neckband 1405 may be coupled to eyewear device 1402 via one or more connectors. The connectors may be wired or wireless and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof.

Pairing external devices, such as neckband 1405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1405 may be communicatively coupled with eyewear device 1402 and/or to other devices. These other devices may provide certain functions (e.g., tracking, localizing, depth mapping, processing, storage, etc.) to augmented-reality system 1400. In the embodiment of FIG. 14, neckband 1405 may include two acoustic transducers (e.g., 1420( ) and 1420(J)) that are part of the microphone array (or potentially form their own microphone subarray). Neckband 1405 may also include a controller 1425 and a power source 1435.

Acoustic transducers 1420( ) and 1420(J) of neckband 1405 may be configured to detect sound and convert the detected sound into an electronic format (analog or digital). In the embodiment of FIG. 14, acoustic transducers 1420( ) and 1420(J) may be positioned on neckband 1405, thereby increasing the distance between the neckband acoustic transducers 1420( ) and 1420(J) and other acoustic transducers 1420 positioned on eyewear device 1402. In some cases, increasing the distance between acoustic transducers 1420 of the microphone array may improve the accuracy of beamforming performed via the microphone array. For example, if a sound is detected by acoustic transducers 1420(C) and 1420(D) and the distance between acoustic transducers 1420(C) and 1420(D) is greater than, e.g., the distance between acoustic transducers 1420(D) and 1420(E), the determined source location of the detected sound may be more accurate than if the sound had been detected by acoustic transducers 1420(D) and 1420(E).

Controller 1425 of neckband 1405 may process information generated by the sensors on neckband 1405 and/or augmented-reality system 1400. For example, controller 1425 may process information from the microphone array that describes sounds detected by the microphone array. For each detected sound, controller 1425 may perform a direction-of-arrival (DOA) estimation to estimate a direction from which the detected sound arrived at the microphone array. As the microphone array detects sounds, controller 1425 may populate an audio data set with the information. In embodiments in which augmented-reality system 1400 includes an inertial measurement unit, controller 1425 may compute all inertial and spatial calculations from the IMU located on eyewear device 1402. A connector may convey information between augmented-reality system 1400 and neckband 1405 and between augmented-reality system 1400 and controller 1425. The information may be in the form of optical data, electrical data, wireless data, or any other transmittable data form. Moving the processing of information generated by augmented-reality system 1400 to neckband 1405 may reduce weight and heat in eyewear device 1402, making it more comfortable to the user.

Power source 1435 in neckband 1405 may provide power to eyewear device 1402 and/or to neckband 1405. Power source 1435 may include, without limitation, lithium ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1500 in FIG. 15, that mostly or completely covers a user's field of view. Virtual-reality system 1500 may include a front rigid body 1502 and a band 1504 shaped to fit around a user's head. Virtual-reality system 1500 may also include output audio transducers 1506(A) and 1506(B). Furthermore, while not shown in FIG. 15, front rigid body 1502 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1400 and/or virtual-reality system 1500 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1400 and/or virtual-reality system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1400 and/or virtual-reality system 1500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

What is claimed is:

1. A head-mounted display system comprising:
   a body having a right side and a left side;
   a display device coupled to the body such that, when the head-mounted display system is donned by a user, the display device is positioned to display content to the user;
   a right side arm comprising an upper end coupled to the right side of the body and a lower end that extends toward a back of the right side of the body;
   a left side arm comprising an upper end coupled to the left side of the body and a lower end that extends toward a back of the left side of the body; and
   a swappable strap comprising:
      a right strap piece assembly detachably coupled to the right side arm by a lip of an outer edge of the right strap piece assembly that fits over and around both the upper and lower ends of the right side arm;
      a left strap piece assembly detachably coupled to the left side arm by a lip of an outer edge of the left strap piece assembly that fits over and around both the upper and lower ends of the left side arm.

2. The system of claim 1, further comprising an electronic component housed within at least one of the right side arm or the left side arm.

3. The system of claim 2, wherein the electronic component comprises an audio transducer.

4. The system of claim 3, wherein:
   the audio transducer comprises a speaker; and
   at least one of the right side arm or the left side arm is dimensioned to direct sound waves generated by the speaker toward an ear of the user.

5. The system of claim 1, wherein:
   the swappable strap is one of a plurality of swappable straps; and
   each of the plurality of swappable straps comprise a first portion and a second portion for coupling to the right side arm and the left side arm, respectively, to form fasteners for individually detachably securing each of the plurality of swappable straps.

6. A method comprising:
attaching an upper end of a right side arm to a right side of a body of a head-mounted display system such that a lower end of the right side arm extends toward a back of the right side of the body of the head-mounted display system;
attaching an upper end of a left side arm to a left side of the body of the head-mounted display system such that a lower end of the left side arm extends toward a back of the left side of the body of the head-mounted display system;
detachably attaching a right strap piece assembly of a strap to the right side arm by applying a downward force to the right strap piece assembly that causes a lip of an outer edge of the right strap piece assembly to fit over and around the upper and lower ends of right side arm; and
detachably attaching a left strap piece assembly of the strap to the left side arm by applying a downward force to the left strap piece assembly that causes a lip of an outer edge of the left strap piece assembly to fit over and around the upper and lower ends of left side arm.

7. The method of claim 6, further comprising housing an electronic component within at least one of the right side arm or the left side arm.

8. The method of claim 7, wherein the electronic component comprises an audio transducer.

9. A strap assembly comprising:
a first strap piece assembly that, when coupled to a right side arm of a body of a head-mounted display system of a plurality of head-mounted display systems, forms a first fastener by fitting a lip of an outer edge of the first strap piece assembly over and around an outer edge of upper and lower ends of the right side arm; and
a second strap piece assembly that, when coupled to a left side arm of the body of the head-mounted display system, forms a second fastener by fitting a lip of an outer edge of the second strap piece assembly over and around an outer edge of upper and lower ends of the left side arm, the strap assembly configured for connection to each of the plurality of head-mounted display systems by forming respective first fasteners and second fasteners that detachably secure the strap assembly to the body of each respective head-mounted display system;
a strap coupled to the first and second strap piece assemblies and dimensioned to secure each respective head-mounted display system to a head of a user.

10. The strap assembly of claim 9, wherein:
the first strap piece assembly is affixed to a first end of the strap using a thermal adhesive; and
the second strap piece assembly is affixed to the second end of the strap using the thermal adhesive.

11. The head-mounted display system of claim 3, wherein at least one of the right strap piece assembly or the left strap piece assembly is dimensioned to cover the audio transducer and to direct sound waves from the audio transducer toward an ear of the user.

12. The head-mounted display system of claim 1, wherein:

the right strap piece assembly comprises an upper side dimensioned to fit over and around the upper end of the right side arm;
the right strap piece assembly is dimensioned such that, when the right strap piece assembly is positioned over the right side arm, a downward force applied to the upper side of the right strap piece assembly causes the right strap piece assembly to snap onto the right side arm;
the left strap piece assembly comprises an upper side dimensioned to fit over and around the upper end of the left side arm; and
the left strap piece assembly is dimensioned such that, when the left strap piece assembly is positioned over the left side arm, a downward force applied to the upper side of the left strap piece assembly causes the left strap piece assembly to snap onto the left side arm.

13. The head-mounted display system of claim 1, wherein:
the right side arm comprises one or more right-side cutouts that reduce a weight of the right side arm; and
the left side arm comprises one or more left-side cutouts that reduce a weight of the left side arm.

14. The head-mounted display system of claim 13, further comprising:
a first electronic component positioned within one of the one or more right-side cutouts of the right side arm; and
a second electronic component positioned within one of the one or more left-side cutouts of the left side arm.

15. The method of claim 8, wherein at least one of the right strap piece assembly or the left strap piece assembly is dimensioned to cover the audio transducer and to direct sound waves from the audio transducer toward an ear of a user.

16. The method of claim 6, wherein:
the right side arm comprises one or more right-side cutouts that reduce a weight of the right side arm; and
the left side arm comprises one or more left-side cutouts that reduce a weight of the left side arm.

17. The method of claim 16, further comprising:
positioning a first electronic component within one of the one or more right-side cutouts of the right side arm; and
positioning a second electronic component within one of the one or more left-side cutouts of the left side arm.

18. The strap assembly of claim 9, wherein:
the first strap piece assembly is dimensioned to direct sound waves from a right audio transducer within the right side arm toward a right ear of the user; and
the second strap piece assembly is dimensioned to direct sound waves from a left audio transducer within the left side arm toward a left ear of the user.

19. The strap assembly of claim 9, wherein:
the right side arm comprises one or more right-side cutouts that reduce a weight of the right side arm; and
the left side arm comprises one or more left-side cutouts that reduce a weight of the left side arm.

20. The strap assembly of claim 19, further comprising:
a first electronic component positioned within one of the one or more right-side cutouts of the right side arm; and
a second electronic component positioned within one of the one or more left-side cutouts of the left side arm.

* * * * *